United States Patent [19]
Hendricks et al.

[11] Patent Number: 5,798,785
[45] Date of Patent: Aug. 25, 1998

[54] TERMINAL FOR SUGGESTING PROGRAMS OFFERED ON A TELEVISION PROGRAM DELIVERY SYSTEM

[75] Inventors: John S. Hendricks, Potomac; Alfred E. Bonner, Bethesda, both of Md.; Richard E. Wunderlich, Alpharetta, Ga.

[73] Assignee: Discovery Communications, Inc., Bethesda, Md.

[21] Appl. No.: 160,281

[22] Filed: Dec. 2, 1993

Related U.S. Application Data

[63] Continuation-in-part of Ser. No. 991,074, Dec. 9, 1992.

[51] Int. Cl.⁶ .................................................. H04N 7/16
[52] U.S. Cl. ......................... 348/1; 348/6; 348/10; 348/12; 455/2; 455/6.2; 455/5.1
[58] Field of Search .................................. 348/1, 2, 5, 7, 348/12, 9, 10, 6, 13, 906, 11; 358/84, 86; 455/4.2, 2, 5.1, 6.1, 6.2, 6.3; H04N 7/16, 7/173

[56] References Cited

U.S. PATENT DOCUMENTS

| | | |
|---|---|---|
| D. 301,037 | 5/1989 | Matsuda . |
| D. 314,383 | 2/1991 | Hafner . |
| D. 325,581 | 4/1992 | Schwartz . |
| D. 329,238 | 9/1992 | Grasso et al. . |
| D. 331,760 | 12/1992 | Renk, Jr. . |

(List continued on next page.)

FOREIGN PATENT DOCUMENTS

| | | |
|---|---|---|
| 2044574 | 12/1992 | Canada . |
| 243312 | 10/1987 | European Pat. Off. . |
| 355697 | 2/1990 | European Pat. Off. . |
| 399200 | 11/1990 | European Pat. Off. . |
| 402809 | 12/1990 | European Pat. Off. . |

(List continued on next page.)

OTHER PUBLICATIONS

Sharpless, "Subscription teletext for value added services", Aug. 1985.
Hong Kong Enterprise advertisement: Two Innovative New Consumer Products From SVI; Nov. 1988; p. 379.
Great Presentations advertisement: Remote, Remote; 1987; p. 32H.

(List continued on next page.)

*Primary Examiner*—John K. Peng
*Assistant Examiner*—Chris Grant
*Attorney, Agent, or Firm*—Dorsey & Whitney

[57] ABSTRACT

A novel reprogrammable set top terminal for a television program delivery system which suggests programs for viewing is described. The invention relates to methods and apparatus for reprogramming set top terminals, and selecting and displaying programs to suggest to subscribers for viewing. The invention is particularly useful in television program delivery systems with hundreds of channels of programming, a menu driven program selection system, and a program control information signal which carries data and identifies the available program choices. Specifically, the invention relates to remote reprogramming of terminal memory and the gathering and analysis of data for selecting programs to suggest to a subscriber. The invention is a terminal which includes a circuit for receiving incoming signals, a processor, memory, and a circuit to generate menu screens for display on a TV or monitor. Various data gathering and analysis techniques are used to customize selection of programs for display on a menu.

56 Claims, 23 Drawing Sheets

U.S. PATENT DOCUMENTS

| | | |
|---|---|---|
| 3,891,792 | 6/1975 | Kimura . |
| 4,361,848 | 11/1982 | Poignet et al. . |
| 4,488,179 | 12/1984 | Kruger et al. . |
| 4,605,964 | 8/1986 | Chard . |
| 4,639,225 | 1/1987 | Washizuka . |
| 4,688,218 | 8/1987 | Blineau et al. . |
| 4,697,209 | 9/1987 | Kiewit et al. . |
| 4,706,121 | 11/1987 | Young . |
| 4,724,491 | 2/1988 | Lambert . |
| 4,792,972 | 12/1988 | Cook, Jr. . |
| 4,829,558 | 5/1989 | Welsh . |
| 4,829,569 | 5/1989 | Seth-Smith et al. . |
| 4,860,379 | 8/1989 | Schoeneberger et al. . |
| 4,876,736 | 10/1989 | Kiewit . |
| 4,928,168 | 5/1990 | Iwashita . |
| 4,947,429 | 8/1990 | Bestler et al. . |
| 4,949,187 | 8/1990 | Cohen . |
| 4,959,810 | 9/1990 | Darbee et al. . |
| 4,961,109 | 10/1990 | Tanaka . |
| 4,975,951 | 12/1990 | Bennett . |
| 4,977,455 | 12/1990 | Young . |
| 4,995,078 | 2/1991 | Monslow et al. . |
| 5,001,554 | 3/1991 | Johnson et al. . |
| 5,014,125 | 5/1991 | Pocock et al. . |
| 5,015,829 | 5/1991 | Eilert et al. . |
| 5,020,129 | 5/1991 | Martin et al. . |
| 5,027,400 | 6/1991 | Baji et al. . |
| 5,036,394 | 7/1991 | Morii et al. . |
| 5,036,537 | 7/1991 | Jeffers et al. ............................ 348/1 |
| 5,046,093 | 9/1991 | Wachob . |
| 5,047,867 | 9/1991 | Strubbe et al. . |
| 5,078,019 | 1/1992 | Aoki . |
| 5,093,718 | 3/1992 | Hoarty et al. . |
| 5,105,268 | 4/1992 | Yamanouchi et al. . |
| 5,132,789 | 7/1992 | Ammon et al. . |
| 5,132,992 | 7/1992 | Yurt et al. . |
| 5,133,079 | 7/1992 | Ballantyne et al. . |
| 5,144,663 | 9/1992 | Kudelski et al. . |
| 5,150,118 | 9/1992 | Finkle et al. . |
| 5,151,782 | 9/1992 | Ferraro . |
| 5,151,789 | 9/1992 | Young . |
| 5,155,591 | 10/1992 | Wachob ............................ 455/4.2 |
| 5,166,886 | 11/1992 | Molnar et al. . |
| 5,172,413 | 12/1992 | Bradley et al. . |
| 5,182,639 | 1/1993 | Jutamulia et al. . |
| 5,202,817 | 4/1993 | Koenck et al. . |
| 5,206,954 | 4/1993 | Inoue et al. . |
| 5,216,515 | 6/1993 | Steele et al. . |
| 5,223,924 | 6/1993 | Strubbe ............................ 348/12 |
| 5,237,311 | 8/1993 | Mailey et al. . |
| 5,247,347 | 9/1993 | Litteral et al. . |
| 5,253,066 | 10/1993 | Vogel . |
| 5,253,275 | 10/1993 | Yurt et al. . |
| 5,260,778 | 11/1993 | Kauffman et al. . |
| 5,283,639 | 2/1994 | Esch et al. . |
| 5,285,272 | 2/1994 | Bradley et al. . |
| 5,289,271 | 2/1994 | Watson . |
| 5,293,540 | 3/1994 | Trani et al. . |
| 5,319,455 | 6/1994 | Hoarty et al. . |
| 5,319,707 | 6/1994 | Wasilewski et al. . |
| 5,323,240 | 6/1994 | Amano et al. ............................ 348/1 |
| 5,327,554 | 7/1994 | Palazzi, III et al. . |
| 5,339,315 | 8/1994 | Maeda et al. . |
| 5,341,474 | 8/1994 | Gelman et al. . |
| 5,343,239 | 8/1994 | Lappington et al. . |
| 5,345,594 | 9/1994 | Tsuda . |
| 5,351,075 | 9/1994 | Herz et al. ............................ 348/1 |
| 5,353,121 | 10/1994 | Young et al. . |
| 5,355,162 | 10/1994 | Yazolino et al. . |
| 5,357,276 | 10/1994 | Banker et al. . |
| 5,367,571 | 11/1994 | Bowen et al. . |
| 5,375,068 | 12/1994 | Palmer et al. . |
| 5,400,401 | 3/1995 | Wasilewski et al. . |
| 5,404,393 | 4/1995 | Remillard . |
| 5,410,326 | 4/1995 | Goldstein . |
| 5,410,344 | 4/1995 | Graves ............................ 348/4 |
| 5,412,416 | 5/1995 | Nemirofsky . |
| 5,414,426 | 5/1995 | O'Donnell et al. . |
| 5,416,508 | 5/1995 | Sakuma et al. . |
| 5,432,542 | 7/1995 | Thibadeau et al. ............................ 348/9 |
| 5,442,626 | 8/1995 | Wei . |
| 5,446,919 | 8/1995 | Wilkins . |
| 5,469,206 | 11/1995 | Strubbe et al. ............................ 348/7 |
| 5,477,263 | 12/1995 | O'Callaghan et al. . |
| 5,479,268 | 12/1995 | Young et al. . |
| 5,481,294 | 1/1996 | Thomas et al. ............................ 455/2 |
| 5,481,296 | 1/1996 | Cragun et al. ............................ 348/13 |
| 5,481,542 | 1/1996 | Logston et al. . |
| 5,483,278 | 1/1996 | Strubbe et al. ............................ 348/7 |

FOREIGN PATENT DOCUMENTS

| | | |
|---|---|---|
| 424648 | 5/1991 | European Pat. Off. . |
| 506435 | 9/1992 | European Pat. Off. . |
| 3423846 | 1/1986 | Germany . |
| 61-060150 | 3/1986 | Japan . |
| 1130683 | 5/1989 | Japan . |
| 1142918 | 5/1989 | Japan . |
| 5250106 | 9/1993 | Japan . |
| 234223 | 11/1994 | Taiwan . |
| 235358 | 12/1994 | Taiwan . |
| 235359 | 12/1994 | Taiwan . |
| 236065 | 12/1994 | Taiwan . |
| 236744 | 12/1994 | Taiwan . |
| 1204190 | 9/1970 | United Kingdom . |
| 2168227 | 6/1986 | United Kingdom . |
| 8601962 | 3/1986 | WIPO . |
| 8909528 | 10/1989 | WIPO . |
| 9100670 | 1/1991 | WIPO . |
| 9103112 | 3/1991 | WIPO . |
| 9211713 | 7/1992 | WIPO . |
| 9212599 | 7/1992 | WIPO . |
| 9217027 | 10/1992 | WIPO . |
| 9221206 | 11/1992 | WIPO . |
| 9322877 | 11/1993 | WIPO . |
| 5,515,098 | 5/1996 | Carles . |

OTHER PUBLICATIONS

Consumer Digest advertisement: Xpand Your TV's Capability: Fall/Winter 1992; p. 215.

Henrie van den Boom: An Interactive Videotex System for Two–Way CATV Networks; AEU, Band 40; 1986; pp. 397–401.

Daniel M. Moloney: Digital Compression in Todays Addressable Enviroment; 1993 NCTA Technical Papers; Jun. 6, 1993; pp. 308–316.

Caitlin Bestler: Flexible Data Structures and Interface Rituals For Rapid Development of OSD Applications; 93 NCTA Tech. Papers; Jun. 6, 1993; pp. 223–236.

A.D. Gelman, et al.: A Store–And–Forward Architecture For Video–On–Demand Service; ICC 91 Conf.; Jun. 1991; pp. 842–846.

Reimer, "Memories in my Pocket", Byte, pp. 251, 252, 254, 255, 256, 258, Feb. 1991.

MOOD QUESTION MENUS

LENGTH OF PROGRAM DESIRED

| SHORT | 30 minutes or less |
| MEDIUM | 30 to 60 minutes |
| LONG | 60 minutes or more |

TYPE OF PROGRAM DESIRED

- SERIOUS
- THOUGHTFUL
- LIGHT

DO YOU WISH AN ACTIVE OR PASSIVE PROGRAM?

- ACTIVE
- PASSIVE

TERMINAL FOR SUGGESTING PROGRAMS OFFERED ON A TELEVISION PROGRAM DELIVERY SYSTEM

RELATED APPLICATIONS

This application is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS. The following other continuation-in-part applications, also based on the above-referenced patent application, are incorporated herein by reference: Ser. No. 08/160,280, entitled NETWORK CONTROLLER FOR CABLE TELEVISION DELIVERY SYSTEMS, filed on Dec. 2, 1993; Ser. No. 08/160,282, entitled AN OPERATIONS CENTER FOR A TELEVISION PROGRAM PACKAGING AND DELIVERY SYSTEM filed on Dec. 2, 1993; Ser. No. 08/160,193, entitled SET-TOP TERMINAL FOR CABLE TELEVISION DELIVERY SYSTEMS filed on Dec. 2, 1993 Ser. No. 08/160,194, entitled ADVANCED SET-TOP TERMINAL FOR CABLE TELEVISION DELIVERY SYSTEMS Ser. No. 08/160,283, entitled DIGITAL CABLE HEADEND FOR CABLE TELEVISION DELIVERY SYSTEM filed Dec. 2, 1993.

BACKGROUND OF THE INVENTION

The invention relates to television entertainment systems for providing television programming to consumer homes. More particularly, the invention relates to a user friendly system for providing consumers with television programming choices.

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels.

The concepts of interactive television, high definition television and 300 channel cable systems in consumer homes will not sell if they are not packaged, delivered and presented in a useable fashion to consumers. The problem is that TV programming is not being presented to consumers in a user friendly manner.

Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

What is needed is an economical system which can present television programs through a user friendly interface which allows the consumer to easily select from among the many program choices.

What is needed is a system that assists the consumer with his program selection.

What is needed is a reprogrammable system for presenting program choices.

What is needed is a system which can be remotely reprogrammed.

What is needed is a system capable of handling hundreds of programs in different formats, be expandable for future types of programming and be inexpensive. The present invention is addressed to fulfill these needs.

SUMMARY OF INVENTION

This invention is a reprogammable terminal for television program delivery systems which is capable of suggesting programs for viewing. Specifically, the present invention may be remotely reprogrammed and is capable of assisting a subscriber in selecting television programs by suggesting programs for viewing. This is a particularly useful invention for television program delivery systems with hundreds of channels of programming and a menu driven program selection system.

Preferably the terminal is located at the television set top and is used with a television delivery system that includes a program control information signal which carries data and identifies the available program choices. The terminal includes means for receiving incoming signals, a processor, memory and means to generate menu screens for display on a TV or monitor.

The terminal can be remotely reprogrammed using an incoming signal. Preferably a software interrupt followed by a memory location or software line number is transmitted via an incoming signal. This is followed by the new software programming which is written into memory at the set top terminal. Using this method, basic programming as well as menu formats, templates, logos, colors etc. may be changed.

The terminal of the present invention can also help a subscriber in selecting programs by suggesting programs to the subscriber. The terminal suggests programs that the subscriber is most likely to watch. The terminal is capable of applying several methods of analysis and a variety of informational sources to solve the problem of choosing a program that the subscriber is most likely to watch. For example, responsive and "intelligent" methods of analysis may be used with mood, personal profile, and historical program watched and network watched data.

Responsive methods of analysis require a subscriber to respond to a variety of questions or select subjective adjectives from program driven menus. The terminal will pose the questions or lists of subjective entries using menus and the subscriber will respond using a user interface, usually an alpha-numeric remote control. For example, subscriber preferences in mood, type of program, category/genre, actor, year preference and standard rating can be selected from menus as search entries. These entries, or key words which correlate to the entries, will be used to search a program database consisting of abstracts of a multitude of programs. The search results in a list of programs which can be displayed to the user.

Intelligent methods "learn" the subscribers viewing choices through analysis of historical data generally gathered by the terminal in a passive mode.

Through a series of analysis and weighing algorithms, the terminal is able to suggest groups of programs. A menu display of the suggested programs is offered to the subscriber. Within the suggested group of programs, the terminal can also prioritize the programs and determine each programs menu position.

It is an object of the invention to provide a user friendly interface for subscribers to access television programs.

It is an object of this invention to assist viewers in choosing programs.

It is an object of this invention to allow subscribers to select a program from among hundreds of choices without a television viewing guide.

It is an object of this invention to suggest program selections to viewers.

It is an object of this invention to monitor subscriber viewing choices.

It is an object of this invention to provide a system which can be reprogrammed.

It is an object of this invention to provide a system which can be remotely reprogrammed.

It is an object of this invention to provide a system which can handle many television programs and menu selection of programs. These and other objects and advantages of the invention will become obvious to those skilled in the art upon review of the following description, the attached drawings and appended claims.

DESCRIPTION OF THE DRAWINGS

FIGS. 12c, 12d and 12e are drawings of mood question menus.

DETAILED DESCRIPTION OF THE PREFERRED EMBODIMENT

A. Television Program Delivery System Description

1. Introduction

Figure 1:
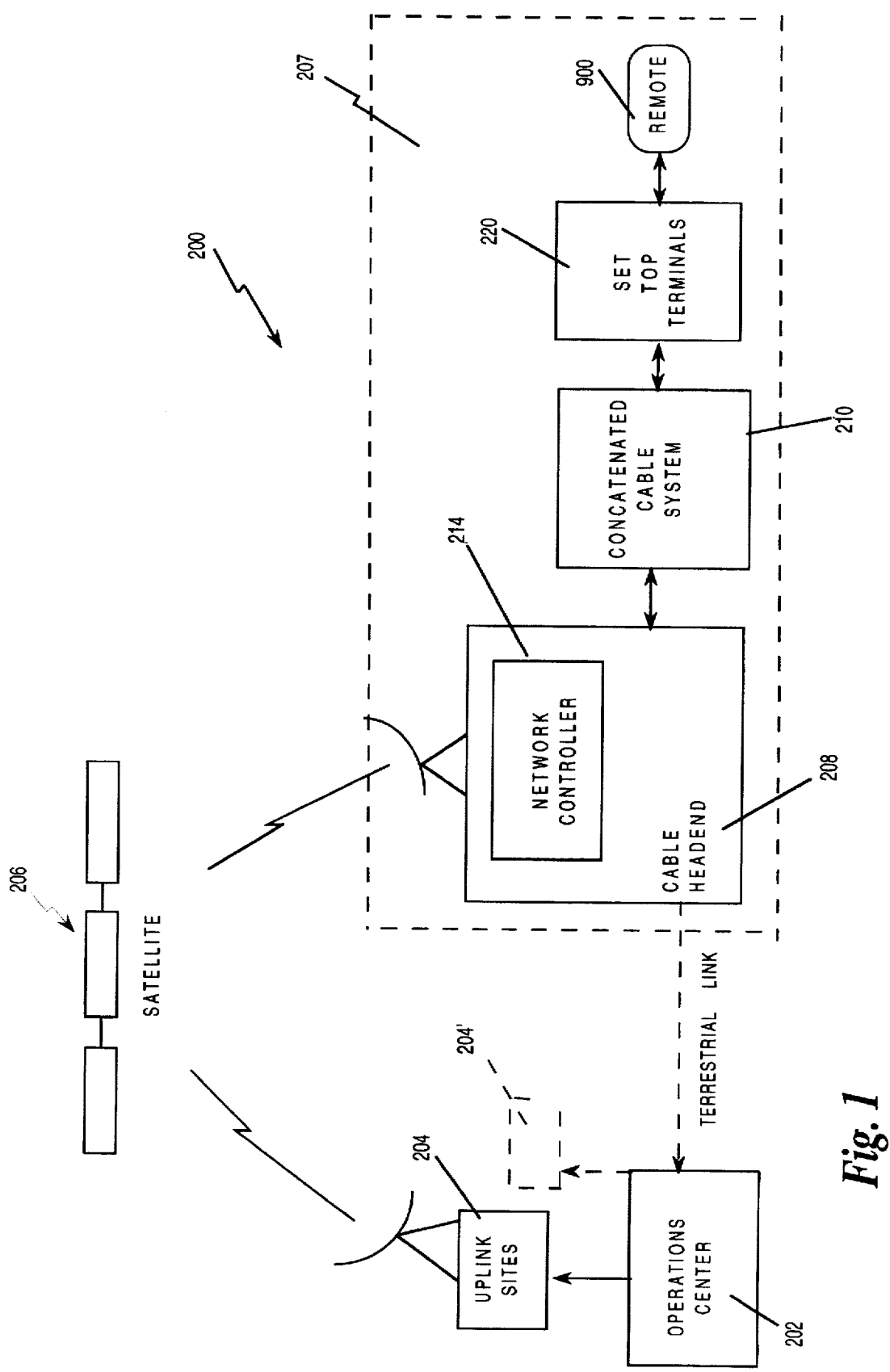
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

Figure 2:
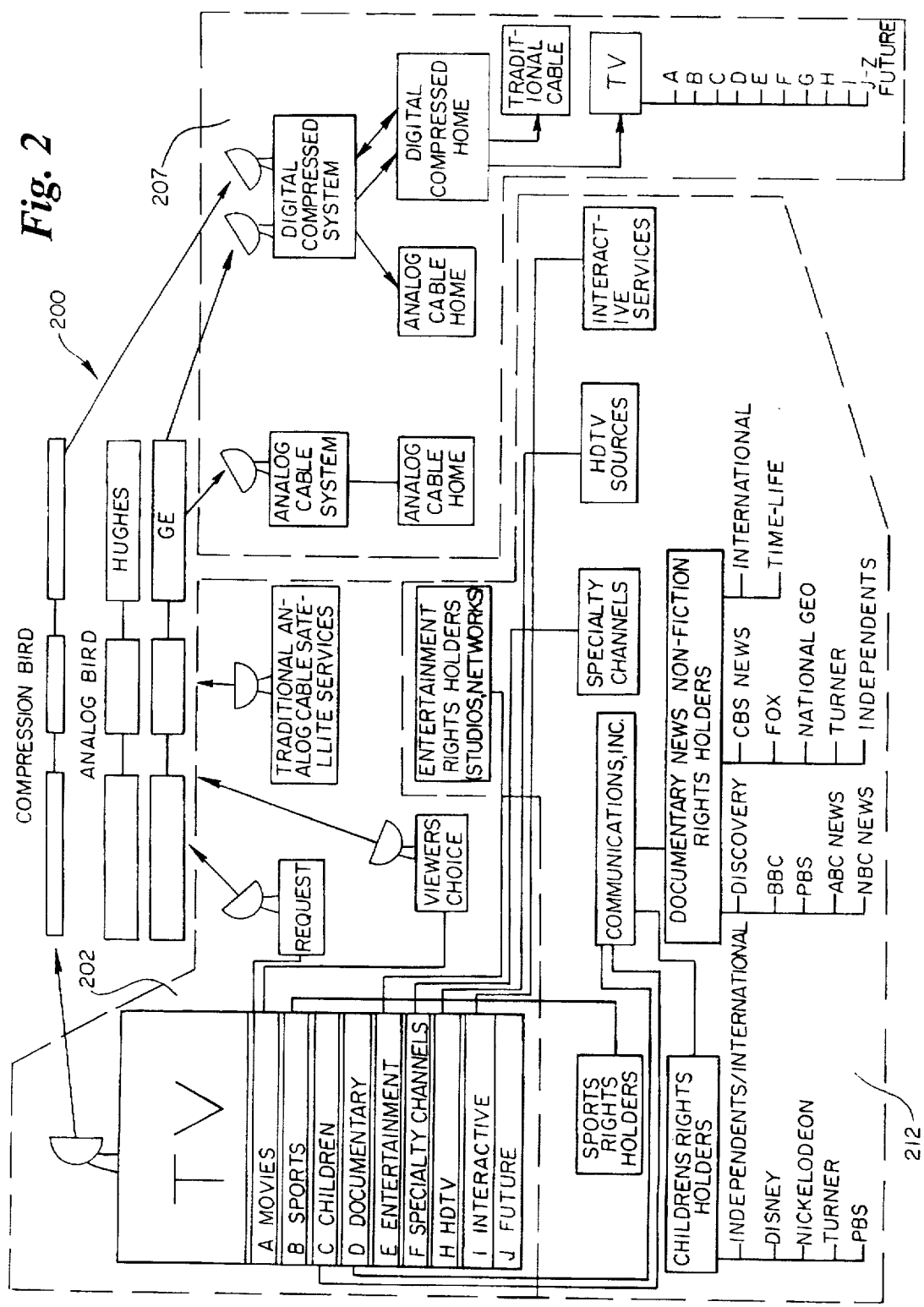
FIG. 2 is an overview of the television delivery system operations.

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

Figure 3:
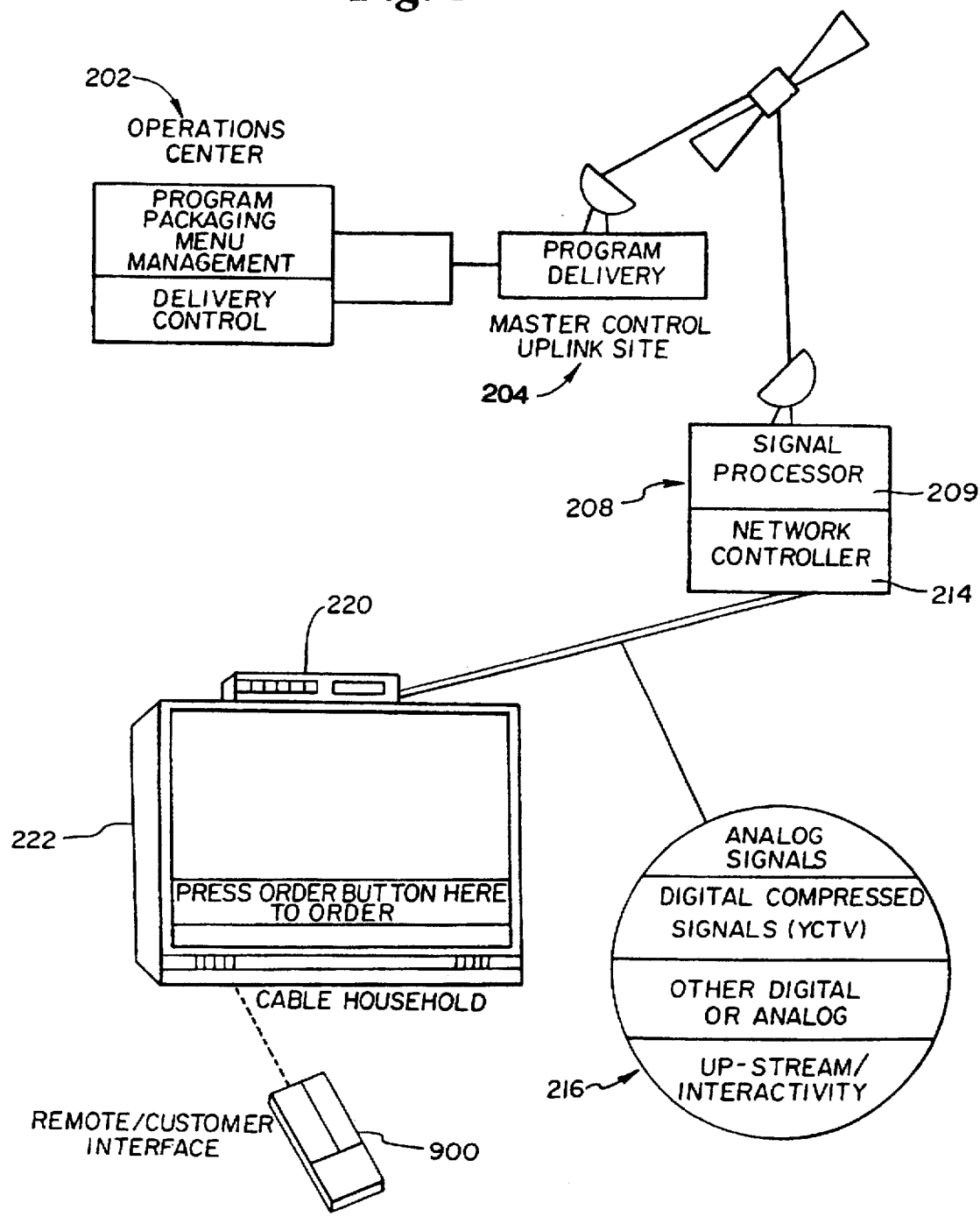
FIG. 3 is a schematic of the operation of the primary components of the system.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers'home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as antitaping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Detailed Set Top Terminal Description

The set top terminal 220 receives and manipulates signals from the cable headend 208. The set top terminal 220 is equipped with local computer memory and the capability of interpreting the digitally compressed signal to produce menus for the subscriber. The remote control 900 communicates the subscriber's selections to the set top terminal 220. The subscriber's selections are generally based upon menus or other prompts displayed on the television screen.

It is preferred that the signal reaches the subscriber's home in a compressed format and is decompressed prior to viewing. Included in the delivered program signal is information that enables equipment at the subscriber's home to display menus for choosing particular programs. Depending on the particular embodiment, the television program signal may arrive at the subscriber's home through one or more connections such as coaxial cables, fiber cables, twisted pairs, cellular telephone connections, or personal communications network (PCN) hookups.

The program control information signal is generated by the operations center 202 and provides the network controller 214 with data on the scheduling and description of programs. In an alternate configuration, this data is sent directly to the set top terminal 220 for display to the subscriber. In the preferred embodiment, the program control information signal is stored and modified by the network controller 214 and sent to the set top terminal 220 in the form of a set top terminal control information stream (STTCIS). The set top terminal 220 integrates either the program control information signal or the STTCIS with data stored in the memory of the set top terminal 220 to generate on-screen menus that assist the subscriber in choosing programs for display.

The types of information that can be sent using the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip or advertisement for the program, and any other program, menu or product information.

With a minimal amount of information being communicated to the set top terminal 220 on a regular basis, the set top terminal 220 is able to determine the proper menu location for each program and the proper time and channel to activate for the subscriber after a menu selection. The program control information signal and STTCIS can be formatted in a variety of ways and the on-screen menus can be produced using many different methods. For instance, if the program control information signal carries no menu format information, the menu format for creating the menus can be fixed in ROM at the set top terminal 220. In the preferred embodiment, the menu format information is stored at the set top terminal 220 in a temporary memory device such as a RAM or EPROM. New menu format information is sent via the program control information signal or the STTCIS to the set top terminals 200 whenever a change to a menu format is desired.

In the simplest embodiment, the menu formats remain fixed and only the text changes. In this way the program control information signal can be limited to primarily text and a text generator can be employed in the set top terminal 220. Another simple embodiment uses a separate channel full-time (large bandwidth) just for the menu information.

Live video signals may be used in windows of certain menus. These video signals can be transmitted using the program control information signal or STTCIS, or can be taken off channels being transmitted simultaneously with the menu display. Video for menus, promos or demos may be sent to the set top terminal 220 in several formats, including (1) on a dedicated channel, (2) on a regular program channel and scaled to size, or (3) along with the program control information signal. However, in the preferred embodiment, a large number of short promos or demo video is sent using a split screen technique on a dedicated channel. A multiple window technique may be used with the menus to display a description of a program and one or more video frames that assist the subscriber in selecting the program.

Figure 4:
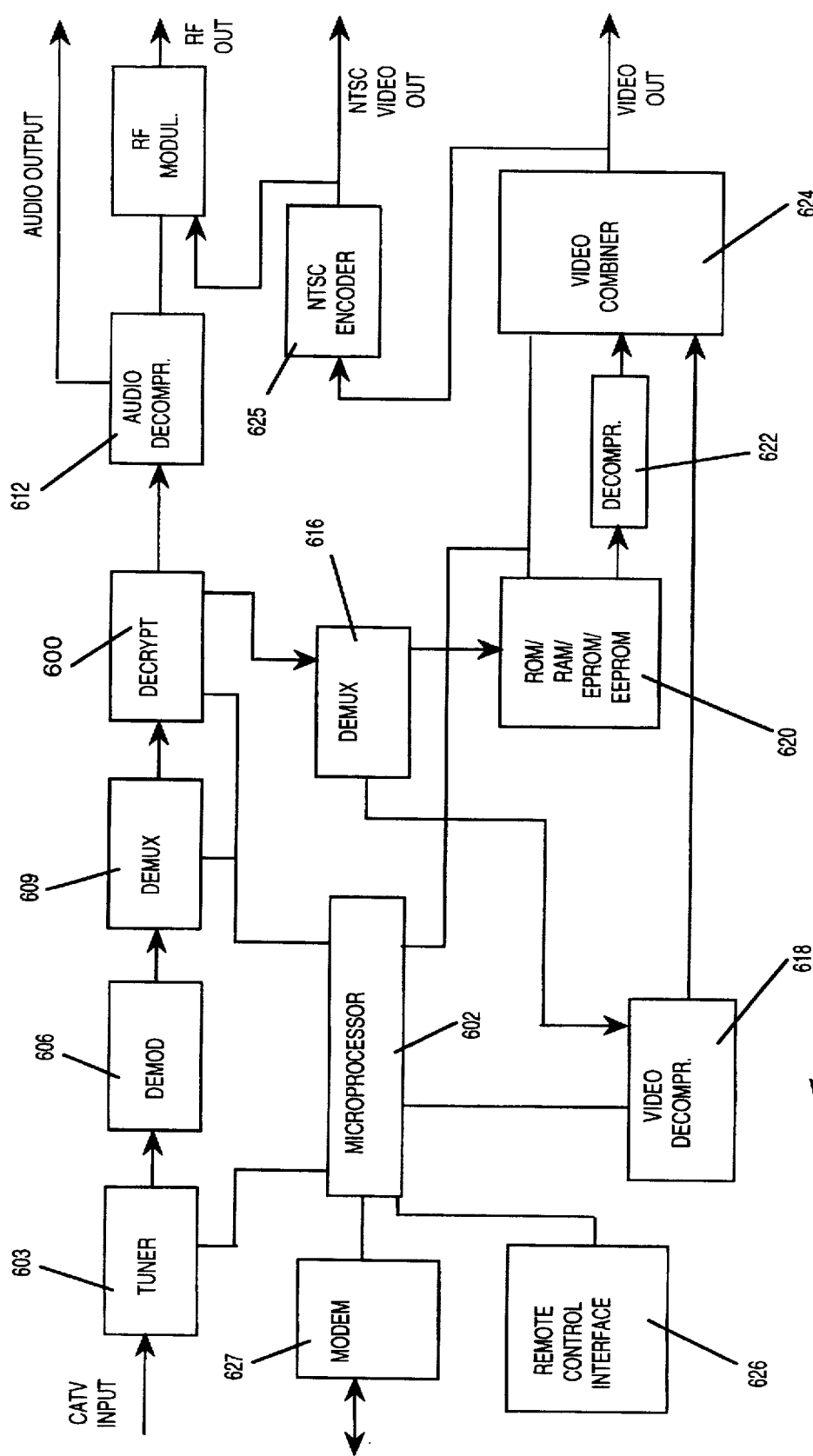
FIG. 4 is a block diagram of the hardware components of the set top terminal.

FIG. 4 shows the basic hardware components of the set top terminal 220. The set top terminal 220 has a tuner 603, digital demodulator 606, decryptor 600, and demultiplexers 609, 616 as well as audio equipment 612 and a remote control interface 626 for receiving and processing signals from the remote control unit 900. An optional modem 627 allows communication between a microprocessor 602 and the cable headend 208. An NTSC encoder 625 provides a standard NTSC video output.

The microprocessor 602 is capable of executing program instructions stored in memory. These instructions allow a user to access various menus by making selections on the remote control 900.

The manner in which the video is decompressed and the menus are generated from the program control information signal or STTCIS varies depending on the specific embodiment of the invention. Video decompressors 618 and 622 may be used if the video is compressed. The program control information signal may be demultiplexed into its component parts, and a video decompressor 618, graphic decompressor, text generator and video combiner 624 may be used to assist in creating the menus.

In addition to the menu format information that is stored in graphics memory, the set top terminal 220 also stores data tracking those programs that have been selected for viewing. By gathering this data, the set top terminal 220 can maintain an accurate record of all programs accessed/watched by storing the data in EEPROM or RAM. Subsequently, this data can be transmitted to the cable headend 208, where it can be used in carrying out network control and monitoring functions. Such data transmissions between the set top terminal 220 and cable headend 208 can be accomplished, for example, through upstream transmission over the cable network or over telephone lines through the use of telephone modems. Where upstream transmission over the cable network is used, the set top terminals 220 can complete data transmissions on a scheduled (e.g., using a polling response or status report to respond to polling requests sent from the cable headend 208) or as-needed (e.g., using a random access technique) basis.

Figure 5A:
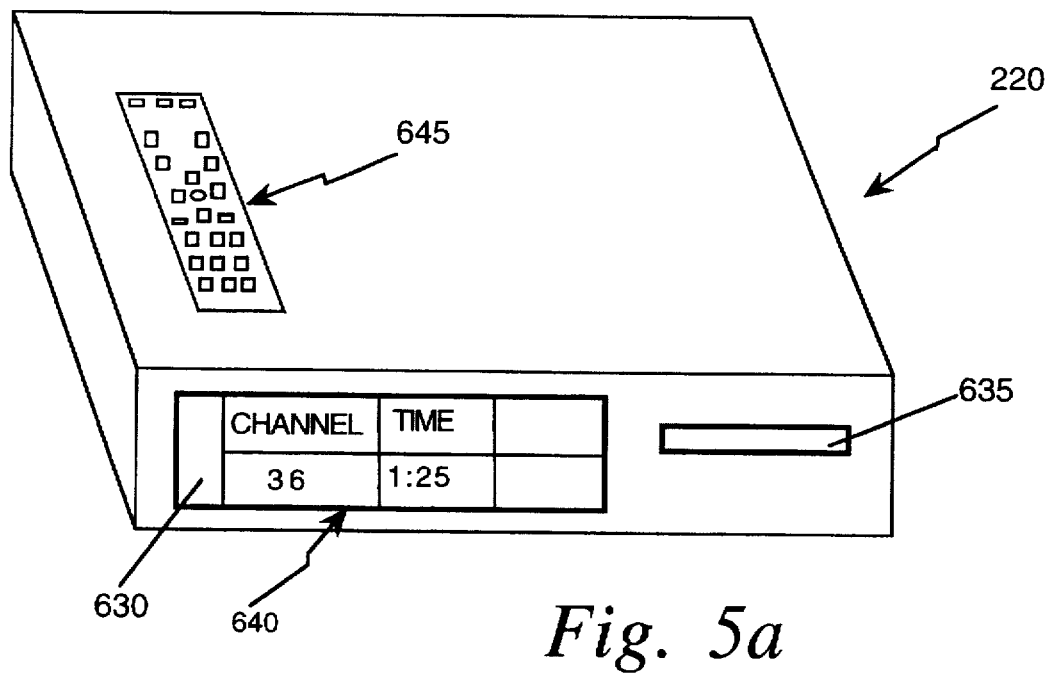
FIG. 5a is a perspective front view of a set top terminal.

FIG. 5a shows the front panel of the set top terminal 220, which includes an infrared sensor 630 and a series of LED displays 640. The LED displays 640 may indicate with an icon or a letter (e.g. A–K) the major menu currently selected by the set top terminal 220 or the channels selected directly by a user, or menu channel selections (e.g., from 1 to 50). Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220. The LEDs 640 may also provide an indication of the digital audio channel currently tuned.

The set top terminal 220 includes a flapped opening 635 on its front that allows the insertion of a magnetic cartridge (or similar portable storage device, including optical disk, ROM, EPROM, etc. not shown). This cartridge opening 635 allows the set top terminal 220 to be upgraded or reprogrammed locally with the use of a magnetic tape cartridge.

On the top or cover of the set top terminal 220 are located pushbutton controls 645. Any function that can be performed on the remote 900 may also be performed at the set top terminal 220 using the duplicative pushbutton controls 645.

Figure 5B:
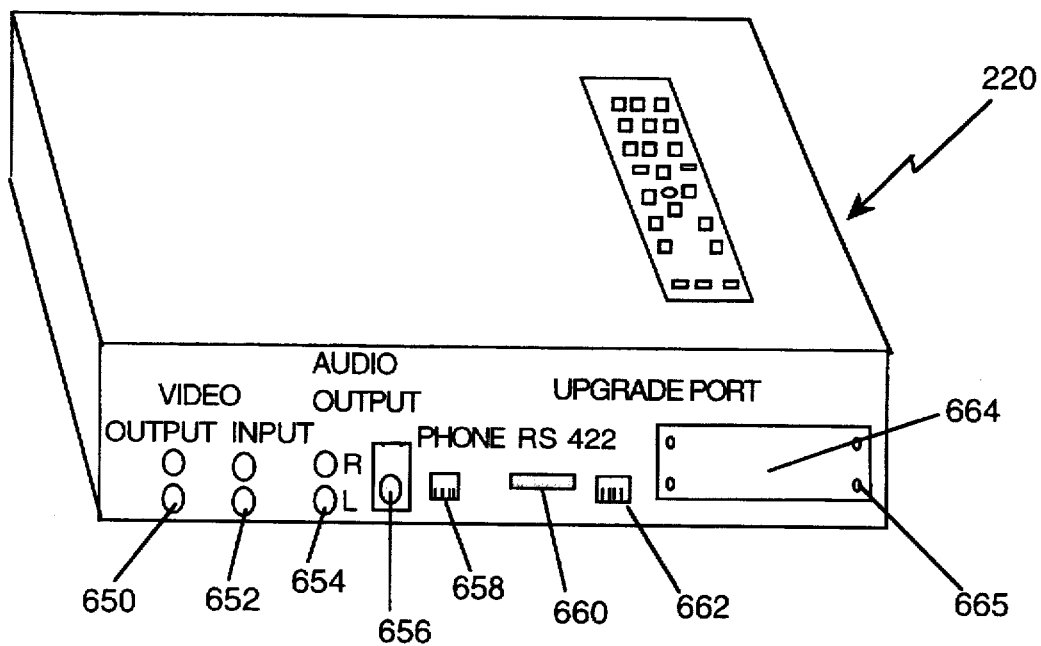
FIG. 5b is a perspective rear view of a set top terminal.

FIG. 5b shows the back of the set top terminal 220, which includes a pair of output terminals 650, pair of input terminals 652, pair of stereo/audio output terminals 654, satellite dish input port 656, telephone Jack 658 and an RS-422 port 660. In addition, an upgrade port 662 and a cover plate 664 are held in place by a series of sheet metal screws. One of the output terminals 650 is for a television and the other is for a VCR. The set top terminal 220 is equipped to handle incoming signals on one or two cables using the input terminals 652. The phone jack 658 and an RS-232 or RS-422 port 660 are provided for maintenance, trouble shooting, reprogramming and additional customer features. In alternate embodiments, the telephone jack 658 may be used as the primary mode of communication between the cable headend 208 and the set top terminal 220. This connection is possible through the local telephone, cellular telephone or a personal communications network (PCN).

The basic programming of each set top terminal 220 is located on ROM within the set top terminal 220. Random access memory, the magnetic cartridge capability, and the expansion card slot 635 each allow upgrades and changes to be easily made to the set top terminal 220.

In the preferred embodiment, the set top terminal 220 includes a hardware upgrade port 662, in addition to expansion card slots. The hardware upgrade port 662 accommodates a four-wire (or more) connection for: (1) error corrected, decrypted data output of the set top terminal 220, (2) a control interface, (3) decompressed video output, and (4) a video input port. In the preferred embodiment, multiple wires are used to perform each of the four functions. The four sets of wires are combined in a single cable with a single multipin connector.

In the preferred embodiment, multipin connections may be used for the multiwire cable. The multipin connection 662 may range from DB9 to DB25. A variety of small computer systems interface (SCSI) ports may also be provided. Alternatively, four or more ports may be provided instead of the single port depicted.

Another port 662 is used to attach the various hardware upgrades described below to a set top terminal 220. The preferred embodiment has a number of hardware upgrades available for use with a set top terminal 220, including: (1) a Level A interactive unit, (2) a Level B interactive unit, (3) a Level C interactive unit with compact disc capability, (4) a Level D digital radio tuner for separate room use, and (5) a Level E information download unit. Each of these upgrades may be connected to the set top terminal 220 unit through the upgrade port 662 described earlier. The same four wires in a single cable described earlier may be used.

Existing set top converter boxes such as those made by Scientific Atlanta or General Instruments are presently unequipped to handle the menu selection system of the present invention. Thus, hardware modifications are necessary in order to use the menu selection system with existing set top converter technology.

Figure 6:
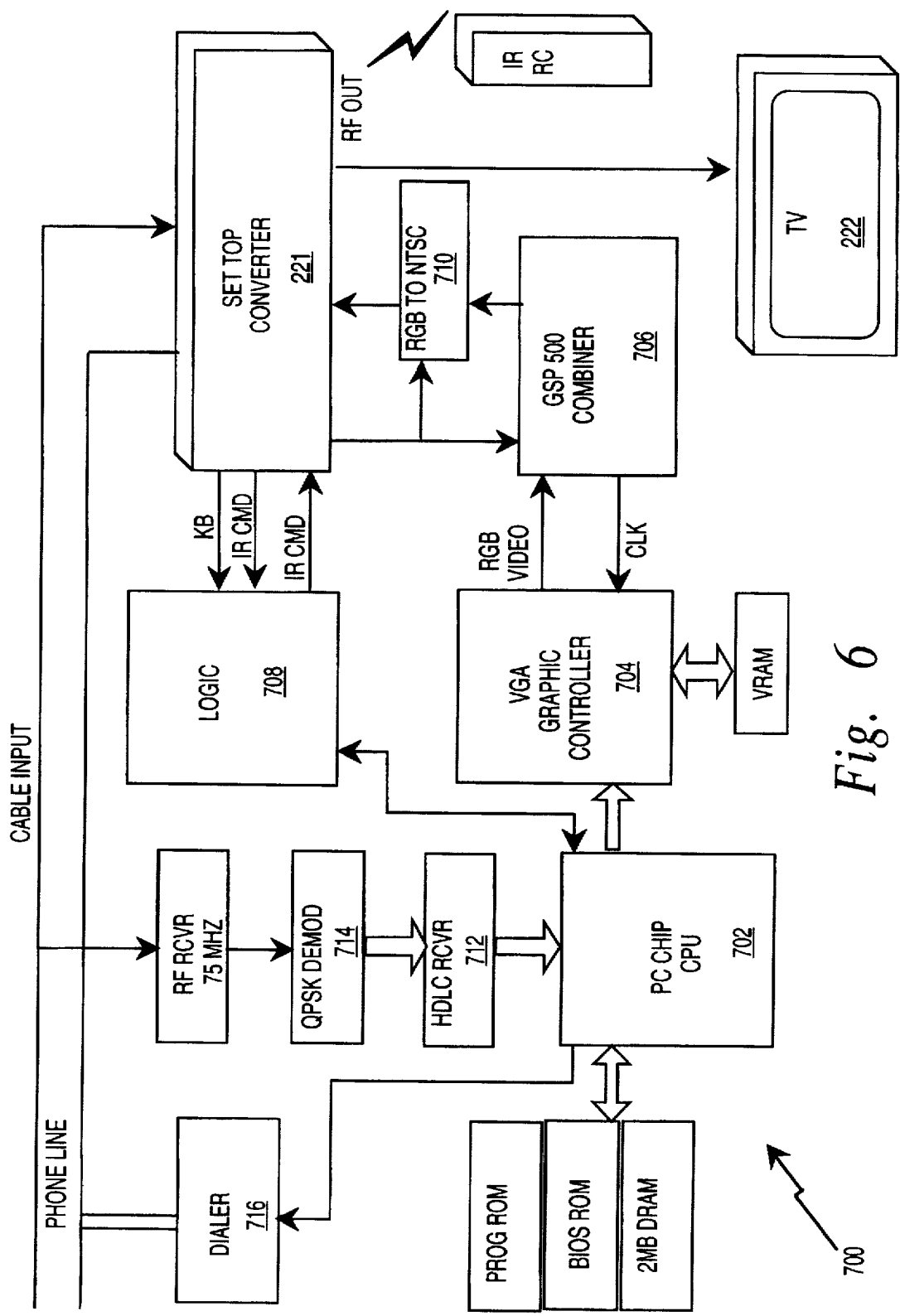
FIG. 6 is a schematic of a Turbo card upgrade for a set top terminal.

A Turbo Card addition to a set top converter is depicted in FIG. 6. The Turbo Card 700 shown provides the additional functionality needed to utilize the menu system with existing set top converter technology. The primary functions the Turbo Card 700 adds to the set top converter are the interpreting of program control information signals, generating of menus, sequencing of menus, and, ultimately, the ability of the viewer to select a channel through the menu system without entering any channel identifying information. The turbo card also provides a method for a remote location, such as the cable headend 208, to receive information on programs watched and control the operation of the set top converter and Turbo Card 700. The programs watched information and control commands may be passed from the cable headend 208 to the Turbo Card 700 using telephone lines.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. The Turbo Card 700 operates by receiving the program control information signal from the cable headend 208 through the coaxial cable. The logic circuitry 708 of the Turbo Card 700 receives data, infrared commands, and synchronization signals from the set top converter. Menu selections made by the viewer on the remote control 900 are received by the set top converter's IR equipment and passed through to the Turbo Card 700. The Turbo Card 700 interprets the IR signal and determines the program (or menu) the viewer has selected. The Turbo Card 700 modifies the IR command to send the program selection information to the set top converter 221. The modified IR command contains the channel information needed by the set top converter. Using the phone line and dialer 716, the Turbo Card 700 is able to transmit program access information to the cable headend 208.

Figure 7A:
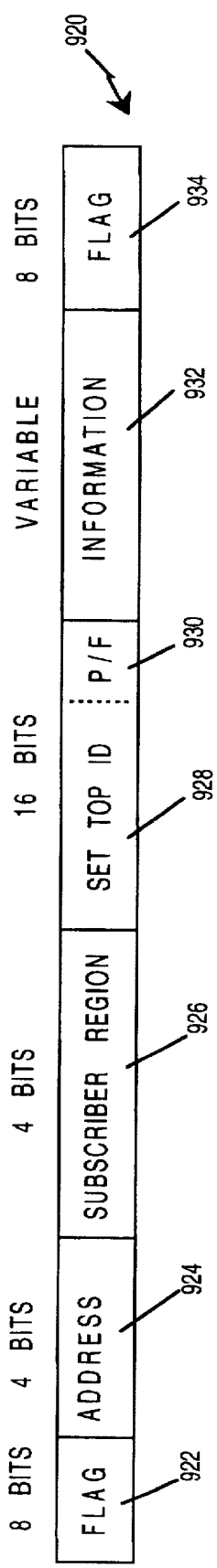
FIG. 7a is a drawing of a frame format for a program control information signal.
Figure 7B:
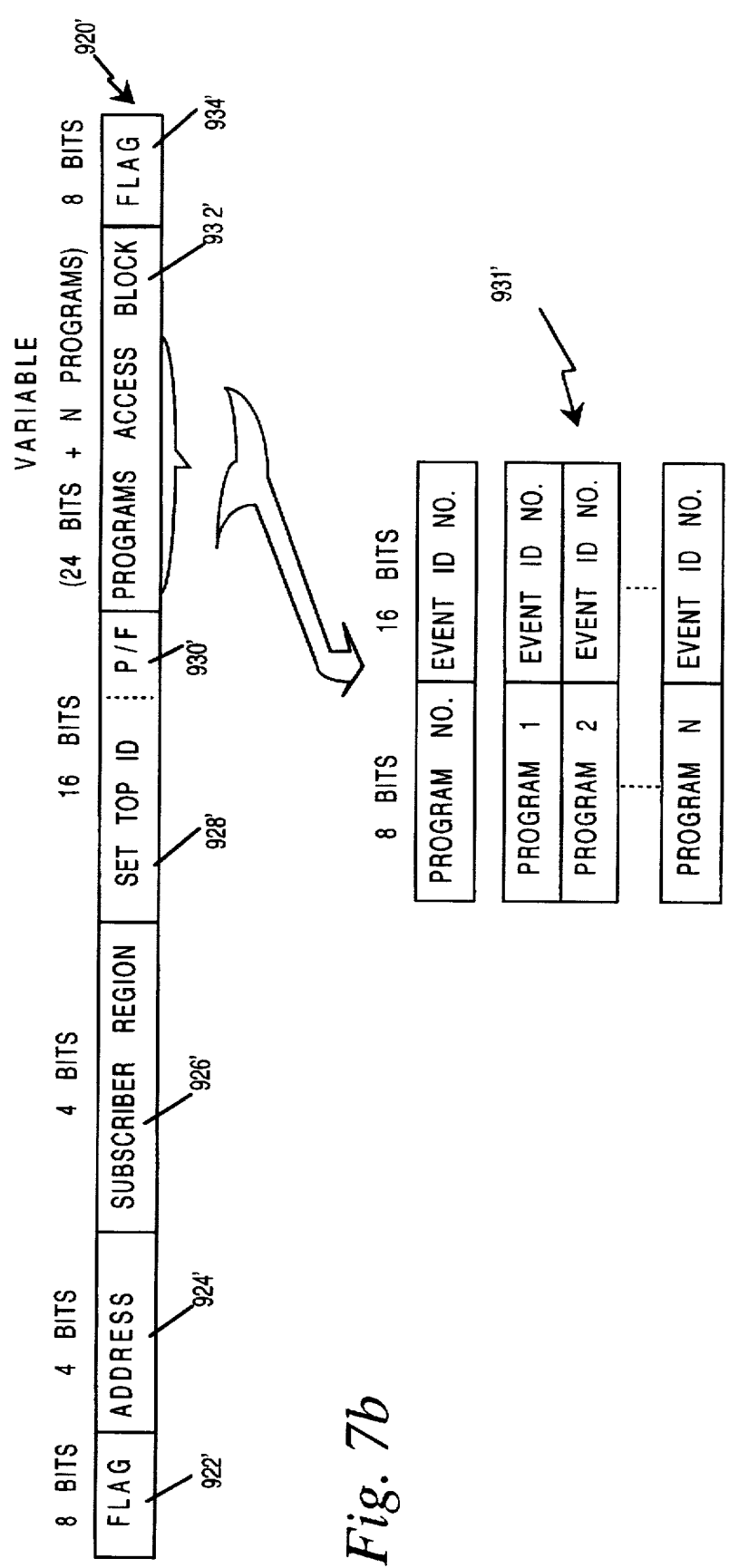
FIG. 7b is a drawing of a frame format for a polling response from the set top terminal.

In the preferred embodiment, program access information is stored at each set top terminal 220 until it is polled by the network controller 214 using a polling request message format as shown in FIG. 7a. This frame format 920 consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message. FIG. 7b shows a response frame format 920' (similar to the frame format 920 end, therefore, commonly numbered with the frame depicted in FIG. 7a, but with the prime indicator added for clarity) for information communicated by the set top terminal 220 to the network controller 214 in response to the polling request of FIG. 7a.

The eight-bit flag sequence 922 that appears at the beginning and end of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response from the set top terminal 220 addressed, as described below. The response frame format 920' also provides a variable-length information field 932'for other data transmissions, such as information on system updates. The frame format 920' ends with an 8-bit flag (or trailing flag) 934' that is identical in format to the leading flag 922', as set forth above. Other frame formats (e.g., MPEG) will be apparent to one skilled in the art and can be easily adapted for use with the system.

Figure 8:
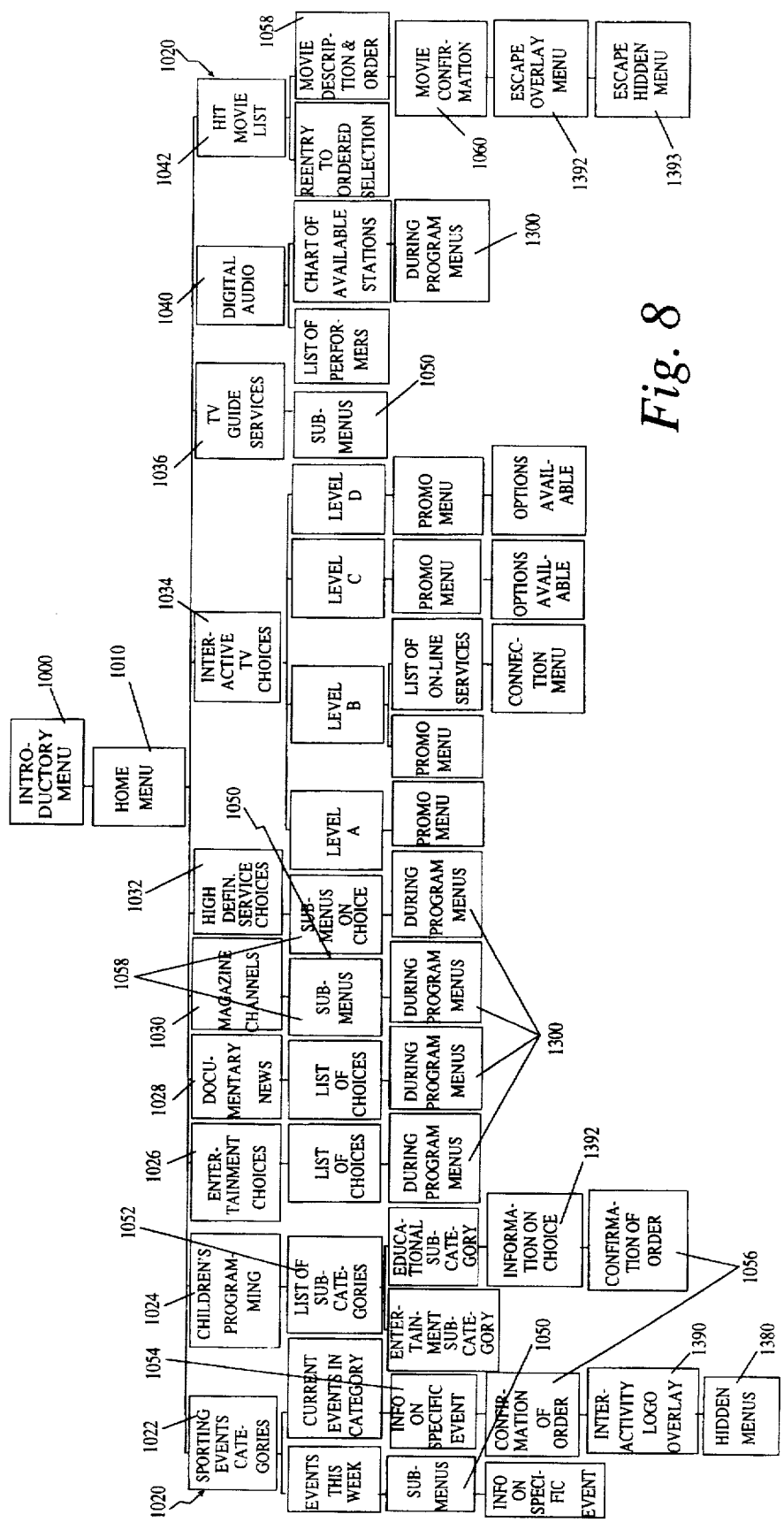
FIG. 8 is a drawing of the basic menus used in the present invention, including ten major menus represented by icons.

As summarized above, images or programs may be selected for display by sequencing through a series of menus. FIG. 8 is an example of one possible structure for a series of menus. Generally, the sequence of menus is structured with an introductory menu, a home menu, various major menus and a multitude of submenus. The submenus can include promo menus and during program menus. For example, at the home menu portion of the sequence of menus and corresponding software routines, a subscriber may select one of the major menus and start a sequence of menu displays. Alternatively, a subscriber may go directly to a major menu by depressing a menu select button on remote control 900.

At any time during the menu sequence, the subscriber may depress a major menu button to move into another series of menus. In this way, a subscriber may move from major menu to major menu.

The various software subroutines executed by the microprocessor 602 allow a subscriber to sequence the menus, navigating through the various menus of the present invention. A subscriber may sequence back through menus or return to the home menu with a single touch of the home menu button on remote 900.

An introductory menu screen 1000 automatically appears upon power-up and initialization of the set top terminal 220. From this introductory menu screen 1000, the set top terminal software will normally advance the subscriber to the home menu screen 1010. The home menu 1010 is the basic menu that the subscriber will return to in order to make the first level of viewing decisions. When the set top terminal software is displaying the home menu 1010, the subscriber is able to access any television programming option. The software allows programming options to be entered through cursor movement on the screen and directly by button selection on the remote control 900.

In the normal progression through the menu screens, the software will forward the subscriber to a major menu screen 1020 in response to the subscriber's remote control 900 selection or highlighted cursor selection from the home menu screen 1010. The selections displayed on the home menu 1010 are for large categories of programming options.

Following the major menu 1020, the subscriber may navigate through one or more submenu screens 1050 from which the subscriber may choose one particular program for viewing. For most programming selections, the user will proceed from the home menu 1010 to a major menu 1020 and then to one or more submenus 1050. However, for certain programming options or functions of the set top terminal 220, the user may skip one or more menus in the sequence.

The During Program Menus 1200 are submenus enabled by the set top terminal software only after the subscriber has selected a television program. These menus provide the subscriber with additional functionality and/or additional information while viewing a selected program. The During Program Menus 1200 sequence can be further subdivided into at least two types of menus. Hidden Menus 1380 and Program Overlay Menus 1390.

To avoid disturbing a subscriber during viewing of a program, the Hidden Menus 1380 are not shown to the subscriber but instead "reside" at the set top terminal 220 microprocessor 602. The microprocessor 602 awaits a button entry either from the remote control 900 or set top terminal 220 buttons before executing or displaying any Hidden Menu 1380 options. The set top terminal software provides the subscriber with additional functions such as entering an interactive mode or escaping from a selected program through use of Hidden Menus 1380.

Program Overlay Menus 1390 are similar to Hidden Menus 1380. However, the Program Overlay Menus 1390 are overlayed onto portions of the displayed video and not hidden. The software for the Program Overlay Menus 1390 allows the subscriber to continue to watch the selected television program with audio but places graphical information on a portion of the television screen. Most Program Overlay Menus 1390 are graphically generated to cover small portions of video. Some Overlays 1390 which are by their nature more important than the program being viewed will overlay onto greater portions of the video. Examples of types of overlay menus 1390 include Notification Menus 1392 and Confirmation Menus 1394. In the preferred embodiment, the software for the Program Overlay Menus 1390 controls the reduction or scales down the (entire) programs video and redirects the video to a portion of the screen.

Submenus provide the cost of viewing the program and the program's length in hours and minutes. From the submenus, the subscriber is given at least three options: (1) to purchase a program, (2) to return to the previous menu, and (3) to press "go" and return to regular TV. The subscriber may also be given other options such as previewing the program.

Using an on-screen menu approach to program selection, there is nearly an unlimited number of menus that can be shown to the subscriber. The memory capability of the set top terminal 220 and the quantity of information that is sent using the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment described.

The set top terminal 220 generates and creates menus using, in part, information stored in its graphics memory. A background graphics file 800 will store menu backgrounds and a logo graphics file will store any necessary logos. A menu display and cursor graphics file will store menu display blocks and cursor highlight overlays as well as any other miscellaneous files needed to build the menus. Using this method of storing menus, the menus can be changed by reprogramming the graphics memory of the set top terminal 220 through instructions from either the network controller 214 or operations center 202.

The microprocessor 602 performs the steps required to create a menu using stored information. The microprocessor 602 fetches a background file, logo file, menu display and cursor file in most instances. The microprocessor 602 fetches text from long-term, intermediate-term, or short-term storage depending on where the text is stored. Using a video combiner (or like device), the stored information is combined with video and the entire image is sent to the television screen for display.

In the preferred embodiment, a graphics controller is used to assist the set top terminal 220 in generating menus. Menu generation by the set top terminal 220 begins with the building of a major menu screen, which includes background graphics for that major menu. The background graphics may include an upper sash across the top of the screen and a lower sash across the bottom of the screen. The background graphics may be generated from the background graphics file 800 in the memory files of the graphics memory (preferably EEPROM). In addition, logo graphics may be generated. Such graphics typically include an icon window, a cable company logo, a channel company logo, and two "go" buttons.

Preferably, the text for each major menu is generated separately by a text generator in the set top terminal 220. Those portions of the text that generally remain the same for a period of weeks or months may be stored in EEPROM or other local storage. Text which changes on a regular basis, such as the movie titles (or other program selections), is transmitted to the set top terminal 220 by either the operations center 202 or the network controller 214 of the cable headend 208. In this manner, the cable headend 208 may change the program selections available on any major menu 1020 by modifying the program control information signal sent by the operations center 202 and transmitting any changes using the STTCIS.

Day, date and time information are added to each major menu. This information is sent from the operations center 202, the cable headend 208 (signal processor 209 or network controller 214), the uplink site, or generated by the set top terminal 220 internally.

The creation and display of program description submenus is performed by the set top terminal 220 in a manner similar to that described above. Each submenu may be created in parts and combined before being sent to the television screen. Preferably, background graphics and upper and lower sashes are used. Likewise, a video window and half-strip window can be generated from information in storage on the EEPROM.

In addition to graphics and text, some submenus include windows that show video. Such video may be still or moving pictures. Still pictures may be stored in a compressed format (such as JPEG) at the set top terminal 220. Video stills may be transmitted by the operations center 202 through the program control information signal from time to time.

Moving video picture is obtained directly from a current video feed as described above. Depending on video window size, this may require manipulation of the video signal, including scaling down the size of the video and redirecting the video to the portion of the menu screen which is within the video window of the menu. Alternatively, the video may be obtained from a split screen channel. Such a method involves the use of split screen video techniques to send multiple video clips on a single channel at a given time. The set top terminal 220 would scale the picture, if necessary, and redirect it to the correct position on the screen using known scaling and positioning techniques. Additional circuitry may be required in the set top terminal 220 to perform adequate scaling and repositioning.

To avoid the need for redirecting video into the portion of the screen which houses the video window, masking and menu graphics may be used to cover the portions of the channel video that are not needed. This masking technique allows the split screen video to remain in the same portion of the screen that it is transmitted by the operations center 202. The masking is then adjusted to cover the undesired portions of the screen. These masks are stored in the background graphics file similarly to other background files for menus.

The split screen video technique may also be used for promoting television programming. Since a great number of short video clips may be sent continuously, full or partial screen promotionals (or informationals) may be provided to the subscriber. With this large quantity of promotional video, the subscriber is given the opportunity to "graze" through new movie or television programming selections. The subscriber simply grazes from promotional video to promotional video until the desired television program is discovered.

C. Program Control Information Signal

Throughout the present application, the term "program control information" is being used to indicate control information coming from the cable headend 208 to the set top terminal 220, whether it is sent directly from the Operations Center 202, processed by the network controller 214 and then forwarded to the set top box, or transmitted over telephone lines.

The program control information signal generated by the Operations Center 202 provides data on the scheduling and description of programs to the network controller 214 or, in an alternate configuration, directly to the set top terminal 220 for display to the subscriber. In the preferred embodiment, the program control information signal is stored and modified by the network controller 214 and sent to the set top terminal 220 in the form of a set top terminal control information stream (STTCIS). This configuration is required to accommodate differences in individual cable systems and possible differences in set top terminal devices. The set top terminal 220 integrates either the program control information signal or the set top terminal control information stream together with data stored in the memory of the set top terminal 220, to generate on-screen displays for assisting the subscriber in choosing programs.

The goal of the menu driven program selection system 200 is to allow the subscriber to choose a program by touring through a series of menus, organized generally as depicted in FIG. 8, utilizing the remote control 900 for cursor movement. The final choice in the series of menus will identify one particular channel and one time for activation of that channel. Armed with a channel and activation time the set top terminal 220 can display the selected program on the television for the viewer. To achieve this goal a simple embodiment assigns an intelligent alpha-numeric code to each program. This alpha-numeric code identifies the category of the program, the menu in which the program should be displayed, its transmission time(s), and the position on the menu that the program should be displayed.

In this simple embodiment, the program control information, including menu codes, is sent continuously from the Operations Center 202 to the network controller 214, and ultimately to the set top terminal 220. For example, four hours worth of programming information can be sent via the program control information signal continuously as shown in Table A.

Table A shows the basic programming information that may be sent to the set top terminal 220. The program descriptions shown are coded abbreviations. For example, C for comedy, N for news, S for sports, A for cartoons, and Tx for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, 01/01/94, represent the date. The following four characters, 1600 represent the start time which is followed by the length of the program and the program name. This entry represents a sports show, a college football game, which will be aired at 4:00 PM on New Years day 1994.

TABLE A

| *Program name | *Program length | *Menu code | *Description | *Video |
|---|---|---|---|---|
| PM | | | | |
| Cheers | .5 | E24 | C | N |
| Terminator | 2.0 | A33 | Tx | S |
| PrimeTime | 1.0 | D14 | N | N |
| Football Special | .5 | B24 | S | N |
| 12:30 PM | | | | |
| 1 Simpsons | .5 | E14 & C13 | C | S |
| 4 Football Game | 3.0 | B13 | S | N |
| * | | | | |
| * | | | | |
| * | | | | |

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

Table B shows an example Events Table that may be downloaded to a set top terminal 220 using the Event.Dat file which contains information about events and pricing. As shown in the table, the three columns of the Events Table identify the field number, the field itself and the type of information downloaded in the Event.Dat file. The first column contains the field numbers 1 through 11. The middle column contains the corresponding field parameters, including the event type, event ID, global channel ID, price, start time, end time, start date, end date, P-icon, name and description. The third column contains corresponding field type information. Field type information typically consists of an unsigned integer; hours, minutes and seconds; months, day and year; and ASCII character identifier.

TABLE B

| Field # | Field | Type |
|---|---|---|
| 1 | Event Type<br>1 = YCTV<br>2 = Pay-Per-View<br>3 = Reg. TV | Unsigned Int |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event.Dat data file. In particular, Table C shows two data streams corresponding to two event types. The first data stream identifies a YCTV™ event in the first field. The second field designates the event ID, which is 1234 in this example. The third field includes the global channel ID number two. The fourth field indicates the cost of 50 cents for this event. The fifth and sixth fields indicate the respective start and end times of 3:00 AM to 3:00 PM, respectively. The seventh and eighth fields show the corresponding start and end dates, designated as 8/25/93 and 8/27/93, respectively. Field nine indicates the P-icon set to PBS.PCX graphics file. Finally, fields ten and eleven indicate the name and description of the events selected, which in this case are Sesame Street™ and Barney™. The second data stream in the Event.Dat example shown in Table C includes analogous information for Terminator IV™, which is designated in field one as a pay-per-view event.

TABLE C

Event.Dat Example

1'1234'2'50'03:00:00'15:00:08/25/93'08/27/93'pbs.pcx'Sesame Street & Barney's Sesame Street and Barney Abstract
2'1234'2'50'20:00:00'22:00:00'08/25/93'08/25/93't4.pcx'Terminator 4'Terminator 4 Abstract The program control information signal and STTCIS can be formatted in a variety of ways and the on-screen menus can be produced in many different ways. For instance, if the program control information signal carries no menu format information, the menu format for creating the menus can be fixed in ROM at the set top terminal. This method allows the program control information signal to carry less information but has the least flexibility since the menu formats can not be changed without physically swapping the ROM.

In the preferred embodiment, the menu format information is stored at the set top terminal 220 in temporary memory either in a RAM, FLASH ROM, EEPROM or EPROM. This configuration provides the desired flexibility in the menu format while still limiting the amount of information needed to be communicated via the program control information signal. New menu format information can be sent via the program control information signal or the STTCIS to the set top terminals 220 each time there is a change to a menu.

Program access information for each program watched is stored at the set top terminal 220 until it is polled by the network controller 214 for information retrieval using the program control information signal or STTCIS. This information retrieval can be accomplished by using the polling request message and response formats, 920 and 920' respectively, as shown, and FIGS. 7a and 7b, and described above, but any suitable polling request and response message format may be used to interrogate each set top terminal 220 sequentially, one by one. The set top terminals 220 are identified by a unique address and set top terminal identifier. It is preferred that the set top terminal 220 transmit information and messages to the network controller 214 only when given permission by the network controller 214 to do so.

Where, for example, specialty programs have been accessed since the previous poll, the set top terminal 220 is given permission to transmit a polling response 920' in the form of a status report that includes any such access information. The network controller's control receiver (not shown) is tasked with the receipt of set top terminal polling responses or status reports. These status reports generally include information that allows the network controller 214 to track a subscriber's program access history.

FIG. 7b shows an example of frame format 920' for the status reports received from the set top terminals 220 during the polling cycle. This frame format is identical to the polling request message format 920 and, as described, includes: (1) a leading flag 922' at the beginning of the message, (2) an address field 924', (3) a subscriber region designation 926', (4) a set top terminal identifier 928' that includes a polling command/response (or P/F) bit 930', (5) an information field 932', and (6) a trailing flag 934' at the end of the message.

The information field 932' remains variable in length so that the status of an indeterminate number of programs, represented at 931, accessed can be included in the frame. In this way, the control message length of the polling request message is minimal since the network controller 214 does not transmit such access information. After a polling response by a given set top terminal 220, however, the control message length increases in proportion to the number of programs accessed.

During transmission, the P/F bit is used to carry out the polling function. In particular, the P/F bit is set to a "1" position to command a polling response from the set top terminal 220 whose address is identified in the frame. The set top terminal 220 addressed must respond to the command in the same P/F bit also set to the "1" position. The response will include the number of programs accessed and their corresponding event identification numbers as shown in FIG. 7b at 931. In cases where the set top terminal 220 has not accessed any programs since the previous polling cycle, the set top terminal 220 responds with the P/F bit set to "1" and the programs access block denoting zero programs accessed.

In between polling cycles, the program control information continues to supply the set top terminals 220 with menu information. In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information. This separate channel would facilitate the rapid downloading of new graphics for the system and would enhance response time when text and other data information needs to be changed.

In the preferred embodiment, the basic building blocks or templates of the on-screen menu displays will be stored in graphics memory consisting of nonvolatile RAM. FLASH ROM, EPROM, or preferably, EEPROM, as shown as 620 in FIG. 9a. Referring to FIG. 4, with the information from the graphics memory 620, the microprocessor 602, graphics decompressor 622, a text generator (not shown in FIG. 4, but incorporated if necessary), and video combiner 624 will build a menu screen.

Figure 9A:
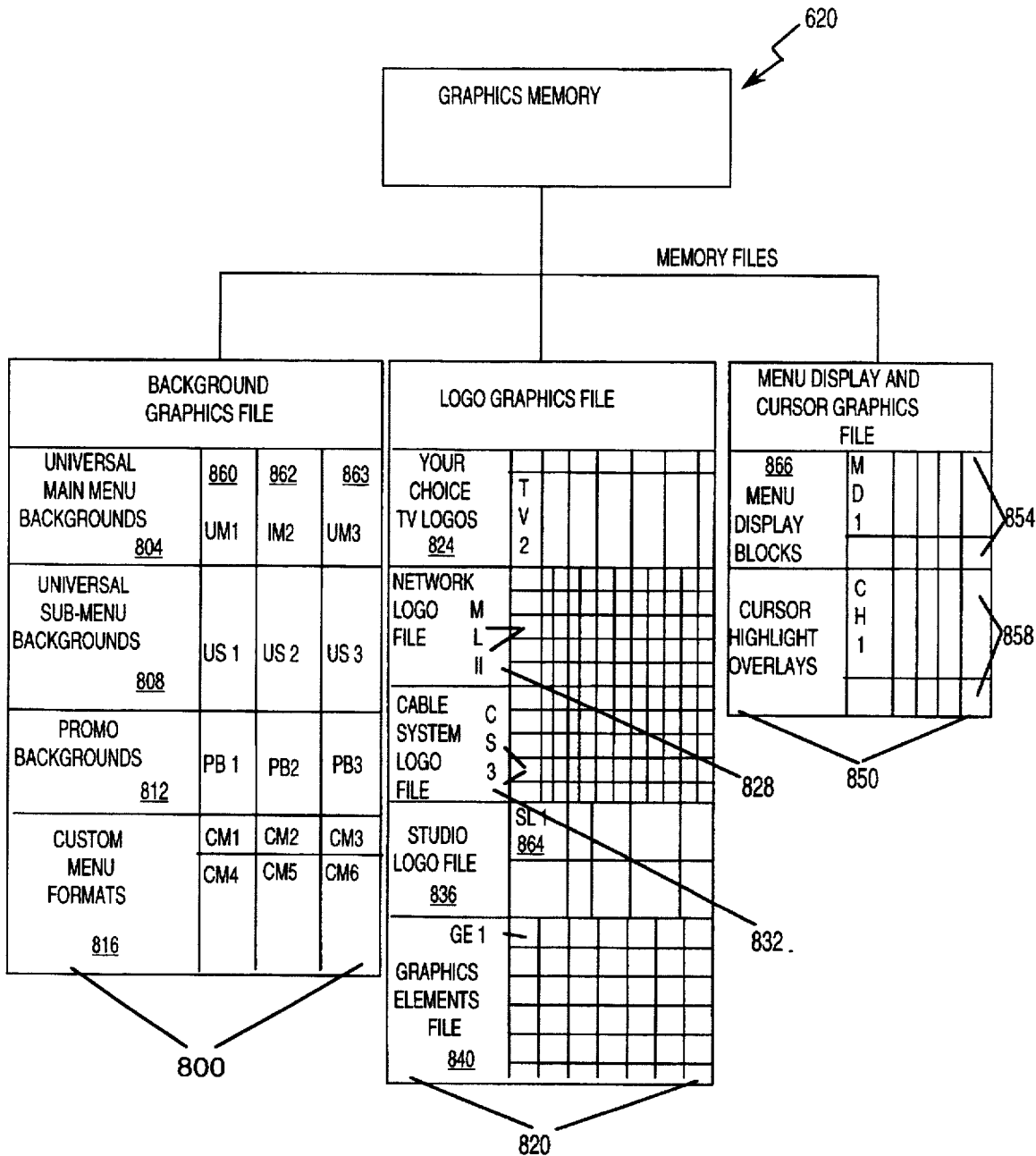
FIG. 9a is a drawing of storage for on-screen menu templates and other graphics files stored in graphics memory of the set top terminal.

The memory files of the graphics memory are preferably categorized into three categories, background graphics 800, logo graphics 820, and menu and display graphics 850, as shown in FIG. 9a.

The background graphics file 800 will store menu backgrounds such as: universal main menu backgrounds 804, universal submenu backgrounds 808, promo backgrounds 812 and custom menu formats 816. The logo graphics file 820 will store any necessary logos such as: Your Choice TV™ logos 824, Network logo files 828, cable system logo files 832, studio logo files 836, and graphic elements file 840. The menu display and cursor graphics file 850 will store menu display blocks 854 and cursor highlight overlays 858, as well as any other miscellaneous files needed to build the menus.

Using this method of storing menus discussed above, the menus can be changed by reprogramming the graphics memory 620 of the set top terminal 220. To revise the entire design of displayed menus, the network controller 214 or operations center 202 instructs the EEPROM 620 to be erased and reprogrammed with new menu templates. To change one menu format or logo, the network controller 214 or operations center 202 instructs just the one location in memory to be erased and rewritten. Obviously, this menu reprogramming can also be done locally (at the set top terminal 220) by a servicemen.

As shown in FIG. 9a, each memory subfile is further divided into various memory blocks. For example, the background graphics file 800 contains the universal main menu backgrounds 804. The universal main menu backgrounds memory 804 includes memory units UM1 860, UM2 862 and UM3 863. Similarly, the logo graphics file 820

Figure 9B:
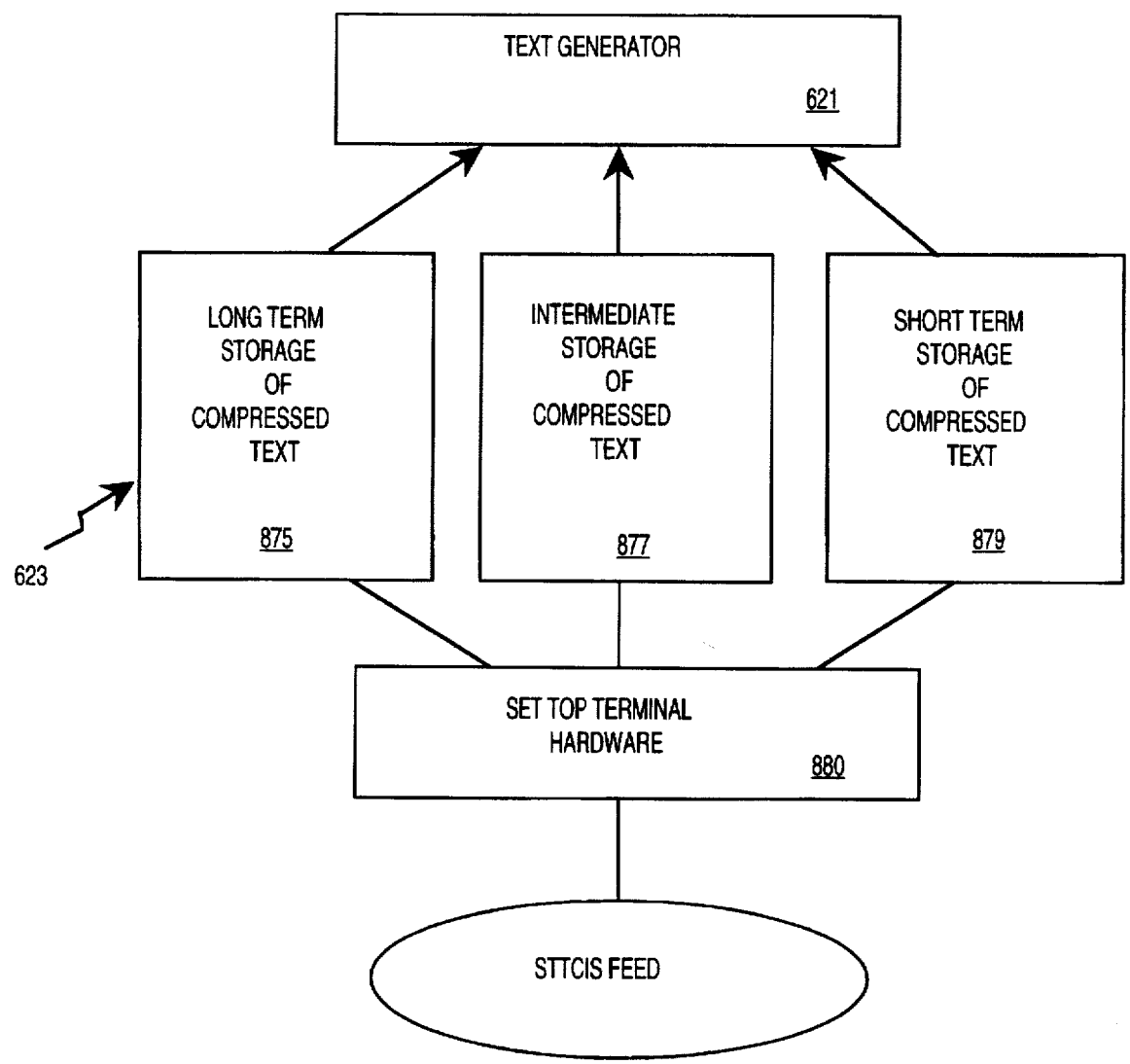
FIG. 9b is a drawing showing the hierarchical storage of text in memory for the set top terminal.

FIG. 9b shows the hierarchical storage of text transmitted from the cable headend 208. Although text may be continuously transmitted with the video signals to set top terminals 220, text may also be transmitted intermittently. In such a case, the text is stored in the set top terminal 220. Preferably, the text is transmitted and stored in a compressed format using known techniques. Additionally, the text is preferably stored in graphics memory 620 within the set top terminal 220.

Depending upon the use of the text, it will be stored in one of three portions of memory. Information sent with the text will either direct the text to a particular portion of memory, or include information as to the priority of text. The microprocessor 602, part of the set top terminal hardware represented at block 880, may then direct the text to the appropriate memory location for storage.

If the text is to be used frequently and over a long period of time a long term storage 875 will be used. If the text will be used for a shorter period of time (for example, a month), the text will be directed to an intermediate storage area 877. If the text is to be used almost immediately, or for a short period of time (for example, within a few days) the text is directed to a short term storage area 879. The microprocessor 602 locates the appropriate text required for a particular menu and retrieves it from the appropriate portion of memory 620. The text is output from the graphics memory 620 to the text generator 621. Text generated from the text generator 621 is thereafter directed to text/graphics video combiner 624.

Figure 9C:
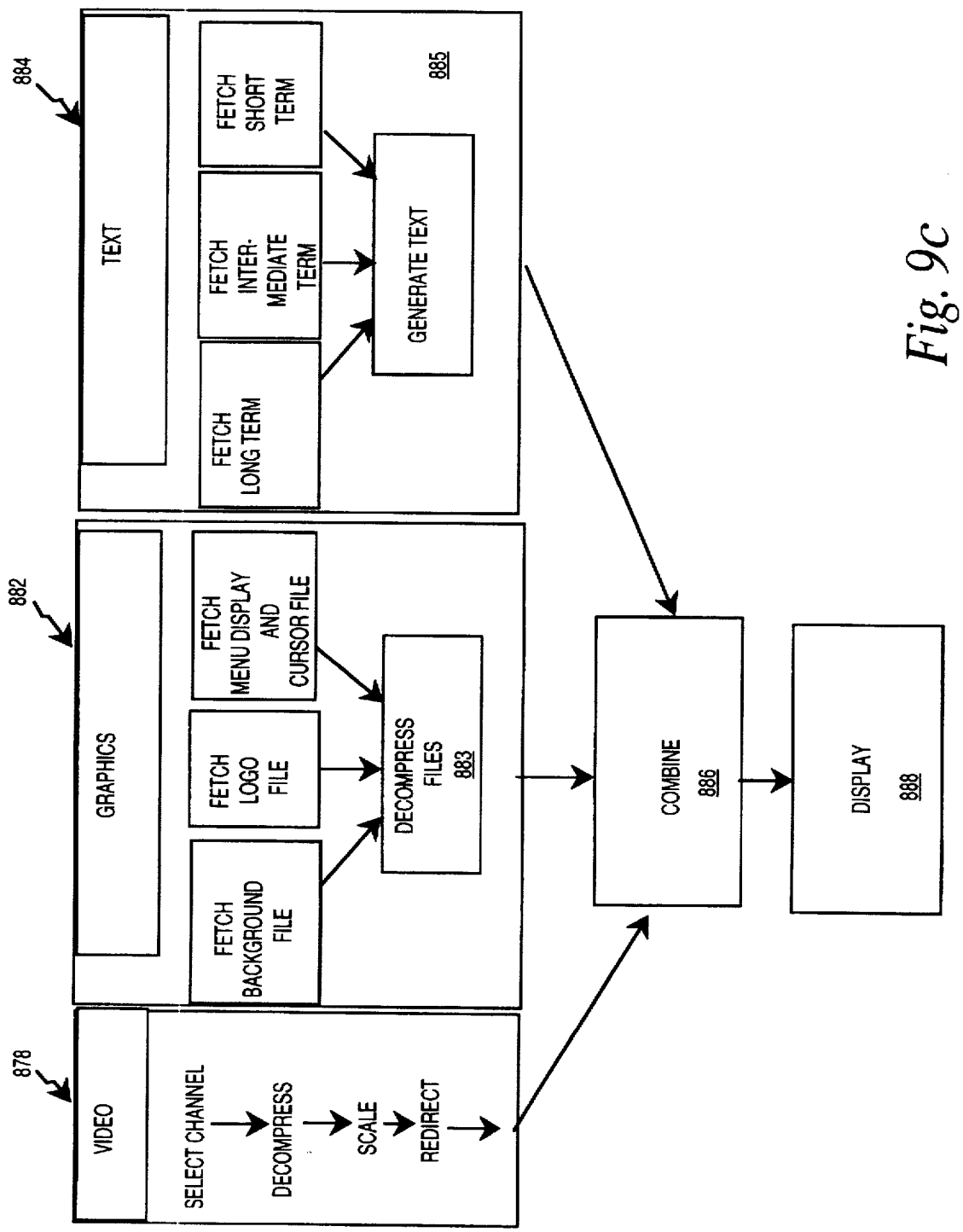
FIG. 9c is a drawing of a flow chart showing the steps required for the microprocessor to retrieve, combine and display a menu.

FIG. 9c shows the steps performed by the microprocessor 602 for creating a menu based upon a series of overlay screens. These instructions are stored in memory within the set top terminal 220 in a screens data file. The screens data file instructs the microprocessor 602 on the location of each graphics file on the screen. An example screens data file is shown in Table D, wherein the screens data file specifies menu data positioning in terms of, for example, x and y pixel positions, height and width, color codes and fonts. Alternatively, instructions or routines may be transmitted from the operations center 202 to be stored in memory within the individual set top terminals 220.

TABLE D

| ~ The following data lines are for the main menu | | | | | | | | | | | |
|---|---|---|---|---|---|---|---|---|---|---|---|
| ~ | | | | | | | | | | | |
| ~ SCREEN | Screen Type '@MAIN | | | | Template File 'main menu.pcx | | Description 'Main Menu | | | | |
| ~ | | | | | | | | | | | |
| ~ STR POS STRING 'MAIN MENU | Justify Left | X '165 | Y '85 | Ht '30 | Wd '300 | FColor '27 | | BColor '55 | Font FUTUR14.GFT | | | |
| ~ PCX POS PCX example1.pcs | Justify 'LEFT | X '190 | Y '75 | Hght '200 | Wdt '200 | | | | | | | |
| ~ ITEM POS ITEM '@YCTV'YOUR CHOICE TV | Justify Left | X '120 | Y '100 | Ht '20 | Wd '400 | FColor '15 | BColor '25 | Font FUTUR12.GFT | X '110 | Y '90 | Ht '30 | Wd '420 |
| ~ ITEM POS ITEM '@PPV'PAY-PER-VIEW HIT MOVIES | Justify Left | X '120 | Y '200 | Ht '20 | Wd '400 | FColor '15 | BColor '25 | Font FUTUR12.GFT | X '110 | Y '190 | Ht '30 | Wd '420 | and menu display and curser graphics file 850 contain individual subfile memory blocks (for example, studio logo file 836 has memory block SL1 864; menu display blocks 854 has memory menu display block MD1 866).

As shown at block 878 in FIG. 9c, initially the microprocessor 602 instructs the tuner 603 to select a channel. The channel is decompressed, error corrected and decrypted, if necessary. If the video is to be reduced in size, so as to be placed within a video window, or is a split screen video window which must be enlarged, the video is scaled to the appropriate size. Additionally, the video may be required to be redirected to a portion of the television screen, accomplished by creating a series of offsets for each pixel location of the video.

Graphics must also be used to create a menu in most instances. As shown in block 882, the microprocessor 602 must fetch a background file, a logo file, and a menu display and cursor file in most instances. Each of these files is decompressed 883, and then combined, block 886.

Similarly, the microprocessor 602 must fetch text, as shown in block 884. Depending upon the memory location of the text, the microprocessor 602 will fetch the text from long-term, intermediate-term, or short-term storage, as described above. Based upon this memory retrieval, the text is generated, block 885, and combined with the video (if any), with as many screens of a decompressed graphics as are necessary, and any text, block 886. The image or portions of the image are stored in the video combiner (for example, combiner 624 of FIG. 4) until all overlays are received. Thereafter, the entire image is sent, under direction of another routine, to be displayed on the television screen, as represented by display block 888.

D. Reprogrammable Terminal for Suggesting Programs

1. Reprogramming the Set Top Terminal

In addition to all the features that the set top terminal 220 supports with internal programming resident at the set top, additional features may be added or existing features upgraded through remote reprogramming of the set top terminal 220. In the preferred embodiment, the cable headend 208, specifically the network controller 214, performs the remote reprogramming of the set top terminal 220. The cable headend 208 is able to reprogram the memory of the set top terminal 220. With this capability the cable headend 208 can remotely upgrade most software or data stored in memory at the set top terminals 220. For example, in the preferred embodiment, the cable headend 208 reprograms the menu format from time to time based upon special events or programming needs, such as Olympic telecasts, presidential elections, etc.

Set top terminal reprogramming preferably operates using the program control information portion of the transmitted signal and sending the appropriate data within the program control information. When reprogramming is to occur, the cable headend 208 will send an interruption sequence within the program control information format that informs the set top terminal 220 that reprogramming information is to follow. In an alternative embodiment, one channel is dedicated for the special programming needs of the set top terminal 220.

Significant reprogramming of the set top terminals 220 will occur infrequently. However, the changing of color or menu formats will occur more often. In alternative embodiments, color changes to menus may be accomplished via the program control information itself and does not require reprogramming from the cable headend 208.

Using the method of storing menus discussed above with reference to FIG. 9a, the menus can be changed by reprogramming the graphics memory 620 of the set top terminal 220. There are at least two methods for reprogramming graphics memory. First, the instructions for generating the menus can be changed. These instructions are stored within the set top terminal 220 in a file (not shown in FIG. 9a). The instructions provide the microprocessor 602 with the location of each graphics file to be displayed on a menu screen (see Table D). Reprogramming the graphics file can be initiated by either sending an interrupt from the network controller 214 or attaching a 2-4 bit code to the program control information signal or the STTCIS indicating that instructions in graphics memory are going to be changed. The signal also designates either the file name to be changed, or alternatively, the memory locations in the graphics memory to be rewritten.

The new instructions could either be sent in the information field 932 (FIG. 7a) of the program control information signal or on a dedicated channel. Upon execution by the microprocessor 602, the new instructions will be loaded into the appropriate files. Alternatively, the new instructions could be loaded into RAM or disc and later stored in the appropriate memory locations upon execution by the microprocessor 602. With the new instructions stored in graphics memory, the microprocessor 602, graphics decompressor, text generator (depicted at 623, FIG. 9b) and video combiner can build new menu screens.

Alternatively, the graphics (e.g., background graphics 800, icons, logo's 820, menu display blocks 854, cursor highlight overlays 858, etc.) can be changed directly by accessing and rewriting the files in graphics memory 620. For example, to revise the entire design of displayed menus, the network controller 214 or operations center 202 instructs the memory to be erased and reprogrammed with new menu templates (or background graphics file). In the preferred embodiment, the menu format information of the on screen menu displays is stored at the set top terminal 220 in graphics memory 620 consisting of RAM, ROM, EPROM, or preferably EEPROM. To change menu formats, logos, icons, etc., directly, the network controller 214 or operations center 202 instructs the appropriate memory locations to be erased and rewritten with the new menu data using memory location identifiers in the instructions sent in either the program control information signal or STTCIS. New menu format information can be sent via the program control information signal or the STTCIS to the set top terminals 220 each time a change in menus occurs.

Obviously, this type of remote menu reprogramming can also be done locally (at the set top terminal 220) by loading an external cartridge into the set top terminal 220 containing reprogramming instructions with the graphics changes.

In addition to menu reprogramming, the software programs resident at the set top terminal may be reprogrammed. Generally, to reprogram software programs resident at the set top terminal 220, the network controller 214 sends an interruption command via the program control information signal or STTCIS (hereinafter designated "program control information signal") informing the set top terminal 220 that reprogramming information will follow. The program control information signal also contains memory address locations or instruction lines where reprogramming will occur. Preferably, both the interrupt and memory address locations are included in the data portion of the program control information signal framework. The data portion of the program control information signal will also include the program changes.

Interpreting the reprogramming software resident at the set top terminal 220, the microprocessor 602 will instruct that the reprogramming changes be stored initially in volatile memory such as RAM. After locating the appropriate memory locations or instruction lines, the microprocessor 602 at the set top terminal 220 reads the frames of program control information received and writes the programming changes to the appropriate memory locations.

Figure 10A:
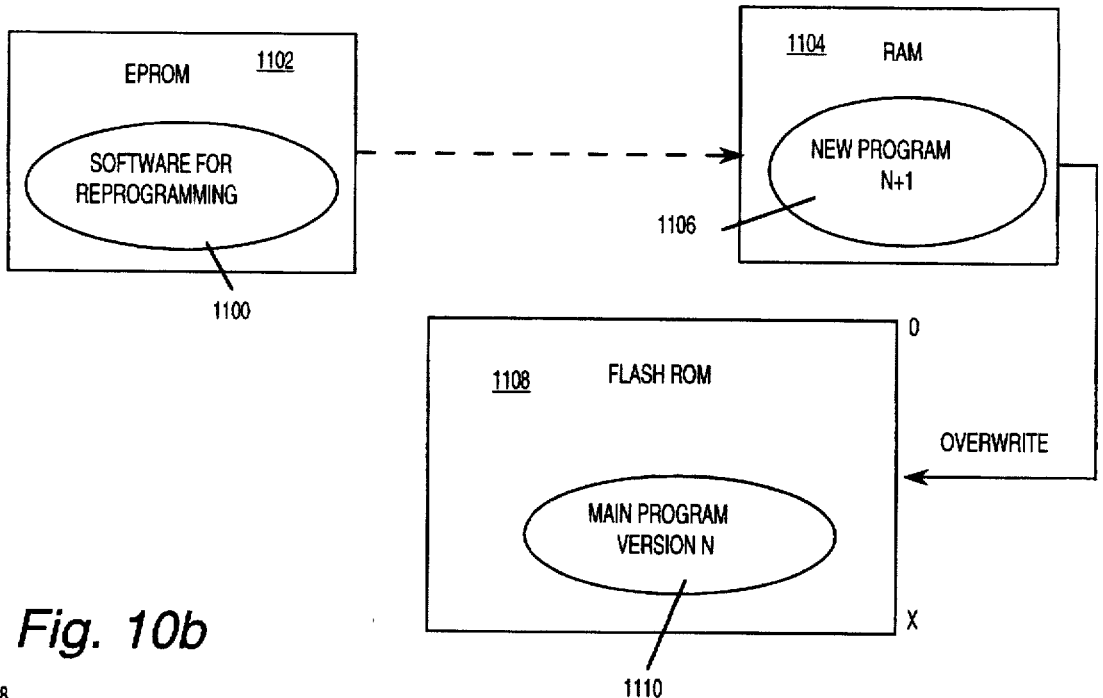
FIG. 10a and 10b are schematics of memory structures for reprogramming the set top terminal.

There are at least two alternative embodiments for implementing the reprogramming of the set top terminal 220 discussed above. The preferred embodiment is shown in FIG. 10a. In this embodiment, the software with reprogramming instructions 1100 is stored in a nonvolatile storage chip (EPROM) 1102 at the set top terminal 220. Since this program is resident in nonvolatile storage, it will be able to continue to execute after a power failure. The current executable program version n is stored on FLASH ROM in storage sectors 0 to x.

Reprogramming of the set top executable program can occur at any time. Reprogramming may commence after the sending of an interruption message via the program control information signal informing the set top that reprogramming will follow. The network controller 214 will follow the interruption message with the new program version n+1 in the data portion of the program control information signal.

The microprocessor 602 recognizes and interprets the interrupt message and directs the execution of the reprogramming software 1100 stored in EPROM. The reprogramming software 1100 instructs the construction of a file in RAM 1104 to house the new program version n+1, as shown at 1106, and the microprocessor 602 will interpret the program control information signal and direct that the new program version n+1 1106 be stored in RAM 1104, as shown.

Once the new program version n+1 1106 is completely loaded in RAM 1104, as indicated by reception of all data packets, the process of reprogramming the FLASH ROM 1108 begins. In this embodiment, the new program version n+1 1106 will be loaded into the same FLASH ROM 1108 as the old program version n 1110. The microprocessor 602 will direct the new program version n+1 1106 to overwrite the old program version n 1110. The old program version n can be rewritten with the new program version n+1 by initially rewriting all locations in the appropriate sector of FLASH ROM 1108 to zero. This sector of memory is then erased and the sector is rewritten with the data in the new executable program version n+1 1106. This process continues sector-by-sector until the new program is completely transferred and stored in the memory locations of FLASH ROM 1108. Upon completion of loading the new program version n+1 into the FLASH ROM 1108, the set top terminal 220 will be reset. After resetting, the set top terminal 220 will commence operating off of the new executable program version n+1.

If there is a failure during the resetting process, the set top terminal 220 will have to send a message to the network controller 214 requesting that the controller resend another copy of the new program version n+1. The reprogramming process will then begin anew, as described in the preceding paragraphs.

Figure 10B:
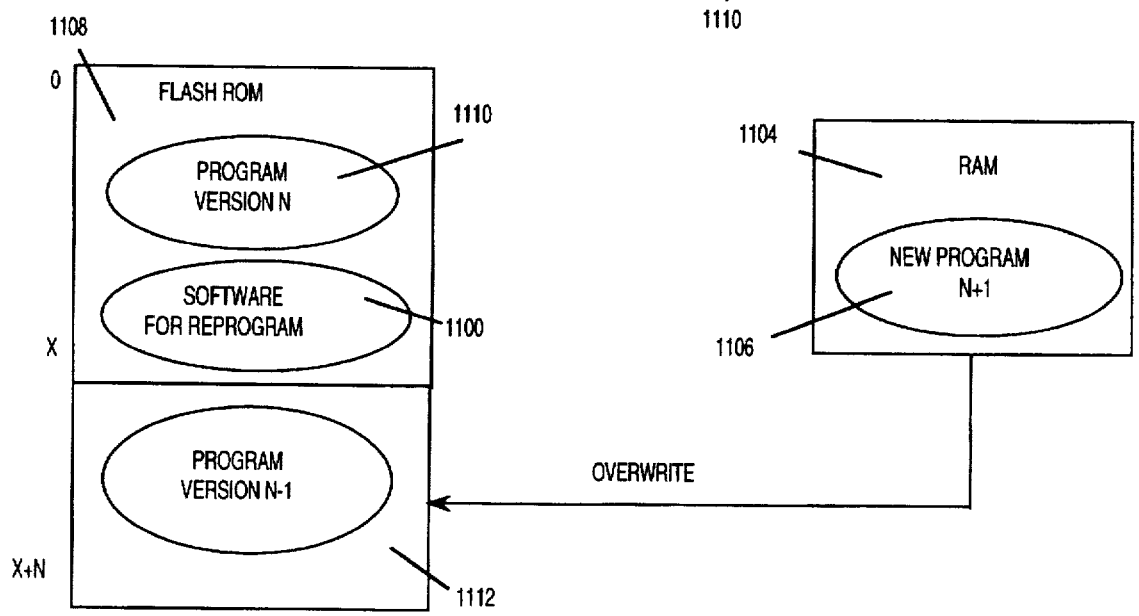

Alternatively, reprogramming can occur with the configuration shown in FIG. 10b. The process for reprogramming in this embodiment is similar to that depicted in FIG. 10a and, therefore, is commonly numbered except for different steps or features. However, a current program version n 1110 remains in FLASH ROM (i.e., is not overwritten with the new version n+1) throughout the process, wherein the new current version will overwrite an old program version n-1 1112. By not overwriting the current program version n 1110, the particular application being changed can continue to operate in normal fashion in the event of failure. The set top terminal 220 continues to run off the program version n 1110 until the new executable program n+1 1106 is completely loaded in the FLASH ROM 1108

As in the embodiment described above with reference to FIG. 10a, the network controller 214 sends an interrupt message via the program control information signal to signify that reprogramming will commence. The new program version n+1 1106 is sent from the network controller 214, or other remote location, in the data frame within the program control information signal.

The microprocessor 602 recognizes and interprets the interrupt message and directs the execution of the reprogramming software 1102. Once the reprogramming software 1102 recognizes the file name of the new program version n+1 1106, the software instructs the construction of a file in RAM to house the new program version n+1 1106. The new program version n+1 1106 is then loaded into RAM 1104. Once all of the packets of the new executable version n+1 1106 are completely loaded in RAM 1104, the process of reprogramming the FLASH ROM 1108 begins. In particular, an instruction commands the initiation of loading the new program version into the sectors X to X plus N of the FLASH ROM 1108. Each sector of memory comprising the old program version n−1 1112 in the FLASH ROM 1108 is rewritten with the new data in the new program version n+1 1106.

If a single FLASH ROM does not have enough memory capacity to store both the current program version n 1110 and new program version, the new program version 1106 can be loaded into a second FLASH ROM.

Upon completion of loading of the new executable 1106 into FLASH ROM 1108, the microprocessor 602 will command that the set top terminal 220 be reset. Resetting the set top terminal 220 will cause the old program version n 1110 to be flushed out, causing the new executable program version n+1 1106 to run.

As an alternative to resetting the entire set top terminal program, the set top executable code can be written modularly, with a main module and a series of sub-modules. With this code structure, the set top program would not necessarily need to be entirely reset when replacement code is provided to the set top. Instead, individual sub-modules may be selectively replaced. Only when a replacement main module is sent, is resetting of the set top program necessary.

The instructions for reprogramming (overwriting) are contained in the main module, which calls sub-modules of code. The sub-modules are not active until called by the main module. During the calling procedure, a check for the existence of replacement code (new code) for that sub-module is performed. This check may be performed either by a physical check of a particular memory location, the setting of a variable in a particular memory location or other method. If replacement code is found for the called sub-module, the replacement code will be run. After a series of error checks on the viability of the replacement code, instructions are sent for the replacement code to overwrite the called upon sub-module in the sub-module's memory location.

Although the embodiments describe three specific methods for accomplishing reprogramming of the set top terminal 220, those of ordinary skill in the art will recognize that the reprogramming methodology is not limited to those embodiments described above but can also consist of embodiments employing different types and configurations of memory devices. Those skilled in that art will also recognize that the reprogramming methodology is not dependent on receiving new programs or graphic files from the network controller 214 or operations center 202 but the new programs or graphic files could also be generated at either the set top terminal 220 or other remote locations.

2. Suggesting Programs Description

Overview

Referring to FIGS. 11a–e, 12a–e, 13a and 13b and 14, the terminal's ability to assist a subscriber in choosing channels or programs for viewing is presented. There are a variety of methods in which a set top terminal 220 can suggest a channel or program for viewing. These methods can be loosely categorized into three groups: (1) responsive methods, (2) intelligent methods and (3) methods which integrate both responsive and intelligent methodologies.

All of the methodologies for suggesting programs have in common the provision of gathering data that is representative of subscriber preferences. The microprocessor 602 will interpret, format and store this data in memory at the set top terminal 220. Alternatively, the subscriber specific data can be stored in memory at the network controller 214. Using program scheduling and descriptive information received from the operations center 202 or network controller 214 in either the program control information signal or STTCIS, and the subscriber specific data, the set top terminal 220 can select programs suited to subscriber viewing preferences based on one of the analytical methodologies described below. These programs can be displayed on the television screen for viewer selection. Once the subscriber has indicated a selection by using, for example, a remote control 900 utilizing cursor movement, the microprocessor 602 at the set top terminal 220 can match the subscriber selection to the program and direct the set top terminal 220 to tune to the selected program.

With memory and a microprocessor 602 built into the set top terminal 220, "intelligent" methods of determining a subscribers programming preference are possible. By analyzing a subscribers past behavior, the set top terminal 220 can literally "learn" to suggest appropriate programming or channels for a viewer. To accomplish this analysis, clues as to the subscribers behavioral pattern must be saved in the set top terminals memory. These clues, such as programs watched and time periods of television viewing, are analyzed as necessary to develop a profile of the viewer. Most of this information is gathered and stored by the set top terminal 220 unbeknownst to the subscriber. A simple example is the set top terminal 220 "learning" which channels are a subscriber's favorite channels. A simple learning process would involve the set top terminal 220 determining which channels were the most often watched by the subscriber and then assuming that those channels are the subscriber's favorite channels.

More sophisticated learning algorithms can be implemented in the set top terminals 220 via expert systems, for example. These expert systems adapt to changing viewer preferences over time and change the corresponding subscriber profile.

Alternatively, a responsive method of suggesting programs or channels may be used. Using the subscriber interface and menu generation, program selections can be responsive to information gathered from inquiries about the particular subscriber or from subscriber selected entries descriptive of preferred programming.

Methods for suggesting programs or channels can integrate the use of the set top terminal's intelligence and information gathering potential. In order to combine the methods, "weights" are generally assigned to various indicators which assist in determining what channel or program the viewer desires. Following evaluation of the weighted information, program or channel suggestions are made to the viewer. For example, the weights attributed to different preference indicators can be accumulated and processed resulting in a selection signal which could be matched to suggested programming through the use of logic networks.

While each of the suggestive embodiments described below are set forth in reference to a set top terminal, numerous hardware variations are possible, including using the embodiments in video rental equipment such as a kiosk.

b. Responsive Embodiment Using Program Abstracts

In the preferred "responsive" embodiment (depicted in FIGS. 11a–e), program abstracts are used to facilitate the suggestion of programs to subscribers. The abstracts are preferably created either at the network controller 214 or the operations center 202. They would be similar in text and format to those used to describe movies currently listed in common TV movie guides. Each abstract contains language descriptive of the particular program's contents. These abstracts are preferably stored in a database either at the network controller 214 or set top terminal 220.

If the program abstract database is stored locally at the set top terminal 220, it can reside in either ROM, EPROM or on disc. If stored at the set top terminal 220, the program abstract database will preferably initially be sent from the network controller 214 or operations center 202 on the program control information signal or on a dedicated channel. In this embodiment, updates and changes to the program abstract database can be accomplished as mentioned above in the description regarding reprogramming the graphics memory.

In this embodiment, the program control information is received by the set top terminal 220 and integrated with menu details stored in graphics memory. With this integrated information, the microprocessor, graphics decompressor, text generator and video combiner will generate a main menu screen and series of submenu screens. The microprocessor 602 directs the displaying of the menu screens to the subscriber. The menu screens, as described in more detail below, comprise a graphical display of search criteria. Each particular search criteria has a list of preference entries.

The subscriber will provide responses to the set top terminal 220 by selecting preference entries indicative of the subscriber's programming preferences. For example, the subscriber can utilize a remote control 900 to facilitate the selection of preference entries by touring through the menus with the assistance of a cursor.

Each subscriber entry will then be mapped into a set of key words selected from a downloaded thesaurus. Alternatively, the subscriber entries could be used as the key words. The key words are then used by the microprocessor 602 to search the program abstract database. If the program abstract database is at the network controller 214, the set top terminal 220 will have to send the key words to the network controller 214. The microprocessor 602 will then select one or more programs to suggest to the subscriber based on the results of the abstract search. These suggested programs will then be displayed on the menu for viewer selection.

More specifically, this embodiment can be described with reference to the menu screens in FIGS. 11a–11e. In this embodiment, as shown in the main menu 1130 depicted in FIG. 11a, a list of possible search criteria (hereinafter criteria) 1132, including mood, type, category/genre, actor, time, year preference and standard rating, are provided to assist in the search of selected program suggestions. The viewer has the option to select as few or as many of the criteria 1132 as desired, with the understanding that the more data provided, the more selective the resulting list of suggested programs. The subscriber can select a desired criteria 1132 by depressing buttons either on a remote portable controller or on the set top terminal 220 to move a cursor or highlight bar on the TV screen.

Following selection of a criteria on the main menu, the viewer may move through one or more submenu screens from which to choose particular entries indicative of programming preferences. As mentioned above, the viewer may choose as few or as many criteria as desired. One criteria depicted in the main menu 1130 is the mood criteria 1134. Upon selection by the viewer of the mood criteria 1134, a submenu 1136 will appear on the screen, depicted in FIG. 11b. The mood submenu 1136 allows the viewer to pick from a list of subjective moods 1138, such as SERIOUS, THOUGHTFUL, LIGHT, TIRED, SAD, etc. Preferably the viewer will use a cursor or highlight bar to scroll down the list of subjective moods and select the preference entries desired by clicking on a select button on either the remote or on the set top terminal 220. The viewer can select one or more of these moods with the exception that the program will not allow the selection of what it determines to be mutually exclusive moods (e.g., HAPPY and SAD). This is accomplished by locking out a mood selection when its opposite has already been chosen.

The selected moods are cross referenced (or mapped) with a list of key words from a downloadable thesaurus table stored preferably in either ROM, EPROM or on disc at the set top terminal 220. The key words will then be used to directly search the abstracts in the program abstract database (not shown).

Referring back to FIG. 11a, the viewer can select the program TYPE criteria 1144 in which to further distinguish the programs by program preference. Upon selection of the TYPE criteria 1144, the TYPE submenu 1146, as shown in FIG. 11c, will appear on the screen. This submenu 1146 consists of a number of descriptive adjectives 1148 that will preferably be used directly as key words to search the abstracts resident in the program database. The viewer can select one or more adjectives 1148 to make the search more selective.

Figure 11A:
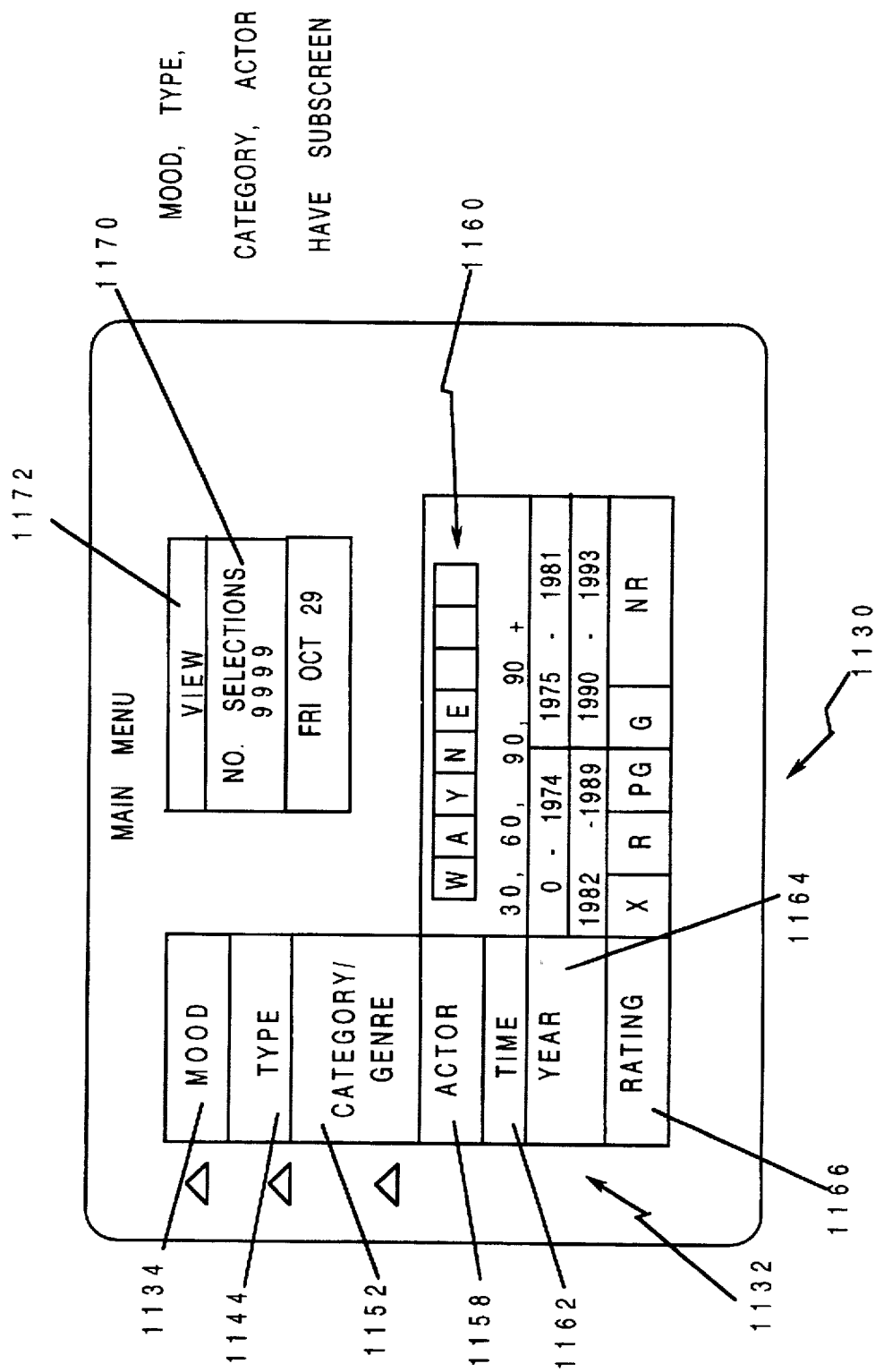
FIG. 11a is a drawing of the main menu used for suggesting programs based on viewer responses.
Figure 11B:
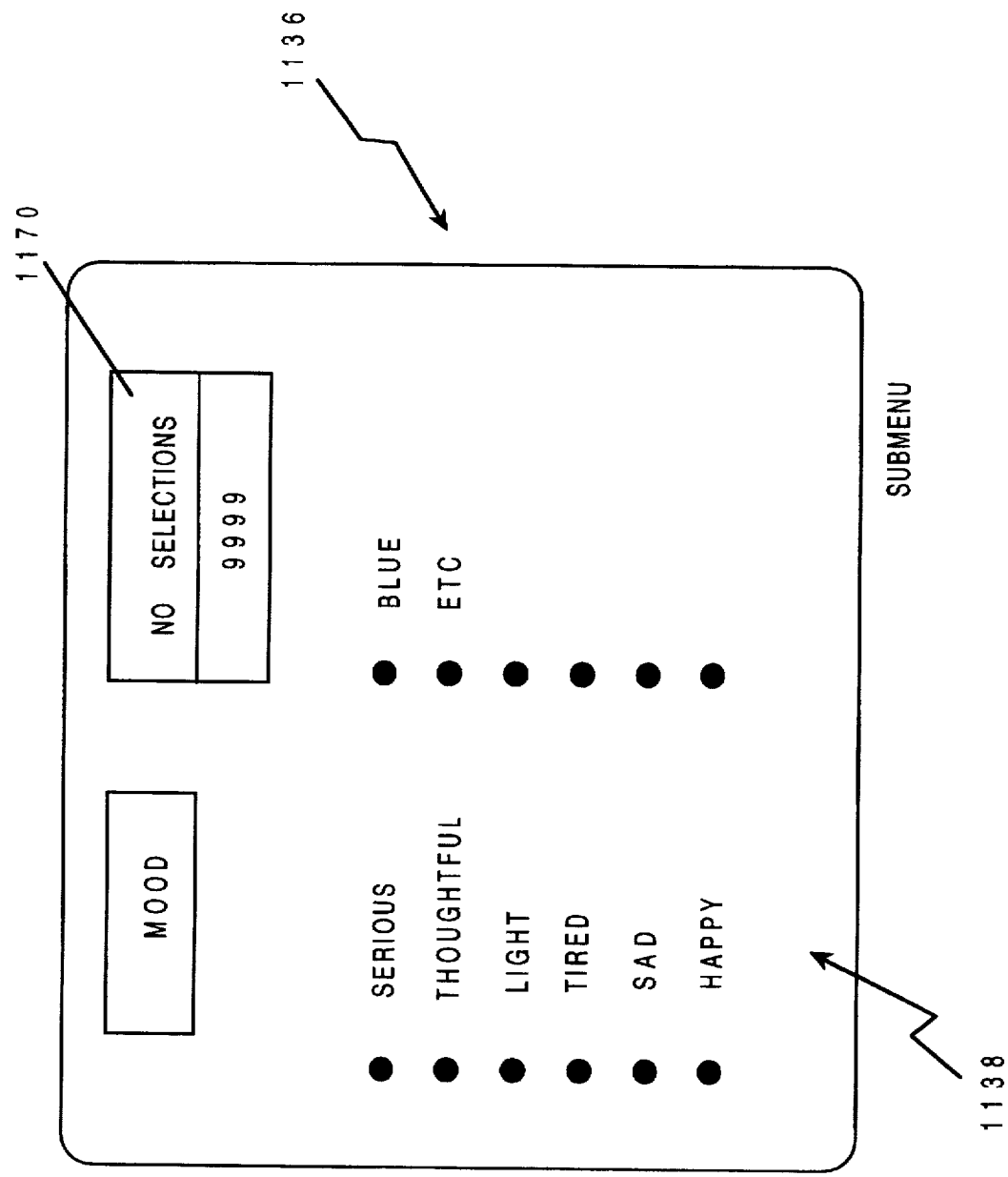
FIGS. 11b, 11c, 11d and 11e are drawings of submenus used for suggesting programs based on user responses.
Figure 11C:
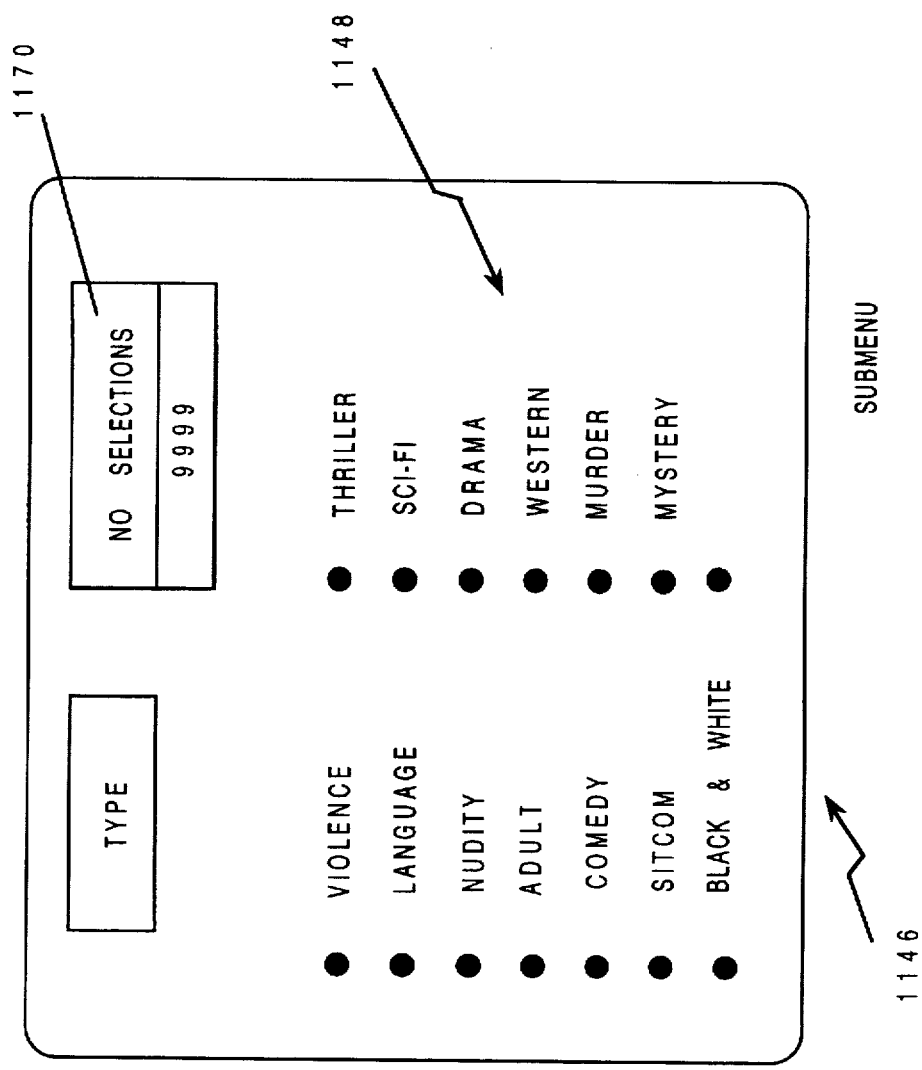
Figure 11D:
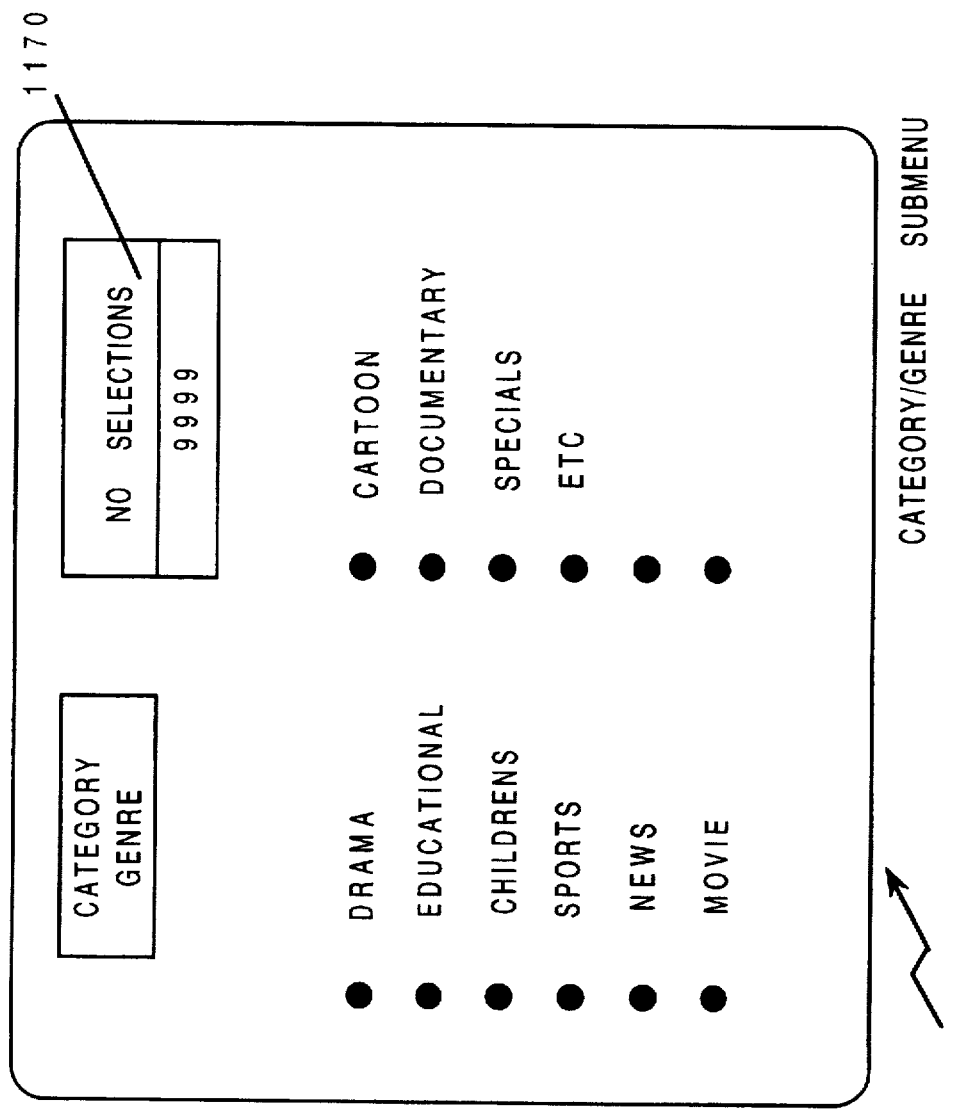

Again, referring back to FIG. 11a, if the viewer selects the standard category/genre criteria 1152 shown in the main menu, the category/genre submenu 1154 will appear as shown in FIG. 11d, allowing the viewer to qualify a search to one or more of the program categories downloaded to the database (example: MOVIE, DRAMA, CHILDREN, etc.).

FIG. 11a shows that a viewer can also refine a search by selecting a favorite actor 1158. Selecting the actor criteria 1158 will allow a viewer to fill in a name entry window 1160. The name entry window 1160 is limited to six letters in the preferred embodiment with the cursor on the first location, and a name is entered sequentially one letter at a time. The channel up/down key, either on the remote or set top terminal 220, allows the viewer to scroll forward and backward, respectively, through the alphabet. When the desired letter has been chosen and entered, the viewer can use the volume up/down key to move left and right in the name through all the letter positions, until the actor's name has been fully or partially entered. The search tool will search for all the occurrences of the letters entered. If the name has been fully entered, a precise search of the program abstract database will be conducted for that name. If the name has been only partially entered, the search tool will look for a closest match to the partially entered name.

The TIME criteria 1162 allows a viewer to choose the preferred time of day, the preferred duration (in 30 minute increments up to 2 hours), and the preferred day of the week. An alternative embodiment would allow the viewer to select up to X hour time periods for a certain day in which to search.

The YEAR criteria 1164 preferably comprises groupings of years. For example, the current year and programs five to ten years old, ten to 20 years old, 20 to 40 years old, and older than 40 years. If desired, the viewer can highlight more than one group of years. If the viewer does not highlight any grouping of years, then all years are assumed desired by the viewer.

The STANDARD RATING criteria 1166 allows the viewer to qualify the search to one or more of the MPAA ratings (G, PG, PG-13, R, NC-17).

In alternative embodiments, the actors, time, years, ratings, etc., can also be selected through the provision of submenus similar to those depicted in FIGS. 11b-11d.

The preferred embodiment also provides for "negative" searches. In this type of search, words descriptive of a program type of no interest to the viewer can either be used directly as key words or mapped into key words in the downloaded thesaurus. If the key words are found in a program during a search of the database, the program is automatically excluded from the selection list. For example, if the viewer does not desire to view any X or R rated movies, the viewer can simply choose to exclude movies rated as X or R by selecting these ratings on the main menu.

In this embodiment, after the viewer has selected as many of the entries as desired, and then hits the "go" button or alternatively selects by cursor or highlight a "go" menu item on the menu screen, the corresponding search will commence. Any typical search tool can be used to search the program abstract database. For example, a Boolean search can be used to scan the database of textual entries and retrieve the textual entries that satisfy the Boolean search. The programs which meet the search criteria (contain the key words corresponding to entries) selected by the viewer will be counted and the count displayed in the "No. Selections" box 1170 in the upper right hand corner of each of the screens 1130, 1136, 1146, 1154 of FIG. 11a through 11d.

Figure 11E:
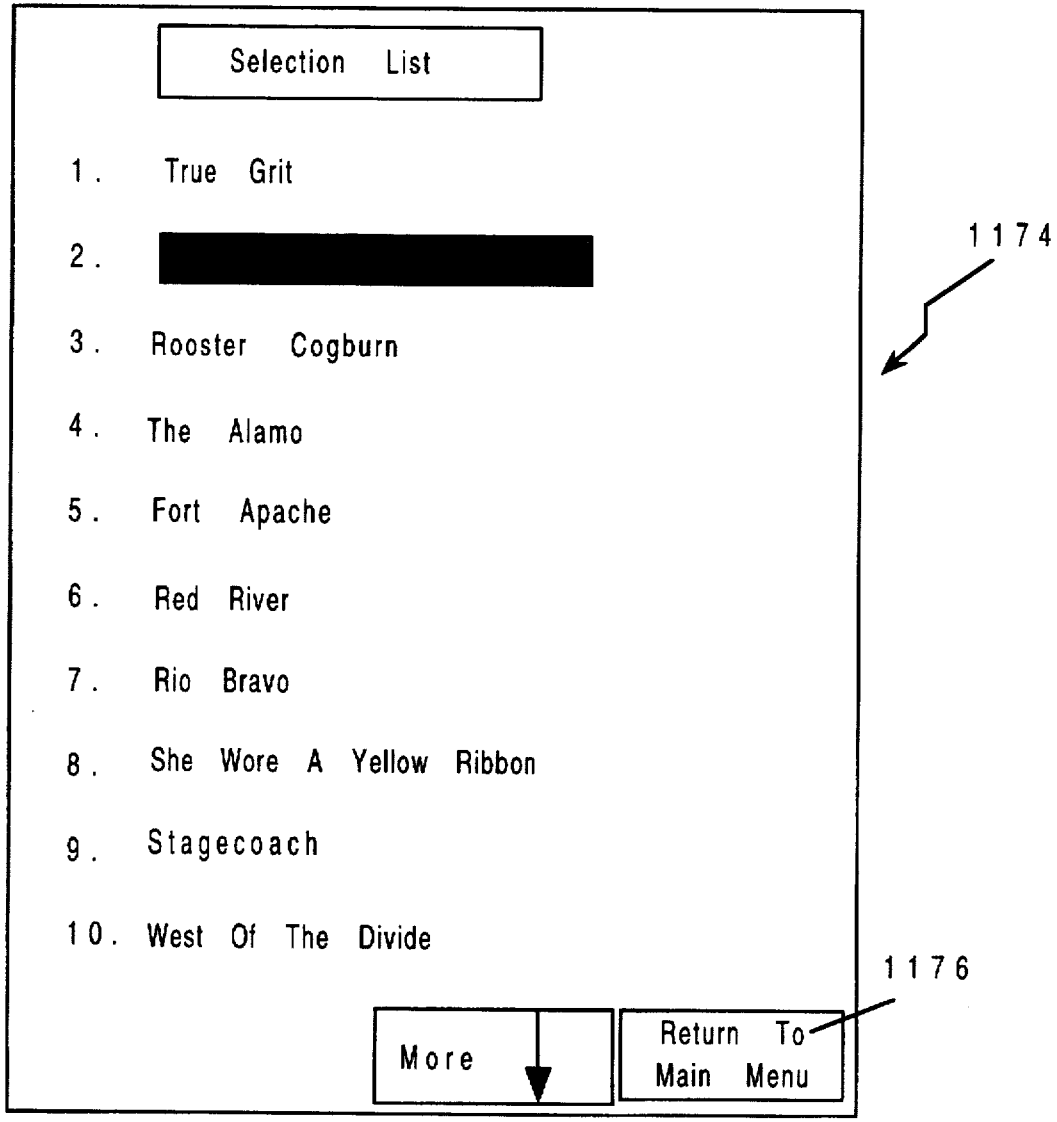

If the viewer desires to view a list of all of these selections and/or corresponding abstracts, the viewer may select the VIEW option 1172 in the main menu 1130. Upon selection of the view option, the microprocessor 602 instructs the selection list menu 1174, as shown in FIG. 11e, to be displayed on the screen. The viewer can scroll down the list by using the cursor and select the desired movie by clicking on the desired program indicated by cursor or highlight. In FIG. 11e, for example, the viewer has selected the John Wayne movie GREEN BERETS. After making the selection, the program is displayed on the screen, but if there are too many or too few programs listed, or the viewer decides not to watch any of the selected programs, the viewer has the option of returning to the main menu by selecting the RETURN TO MAIN MENU box 1176. Once the main menu screen 1130 is displayed, the viewer may choose to begin a completely new search, or alternatively, may refine the prior search. If the viewer chooses to perform a refined search, the viewer can access the various submenus and choose further preference entries resulting in a more precise search and fewer number of program selections.

It is understood that this embodiment of searching program abstract databases can be combined with the other methods described below, including viewer profile data and most often watched information. For example, different criteria can be assigned different weights (weighting the criteria's preference entries). Then based on an evaluation of the weighted preference entries, only those programs satisfying a minimum weighted index would show up as a selection to be suggested to the viewer.

Alternatively, program indicators can be generated and used in assigning a weight number to programs. The weight a program is assigned could be based on either most watched program information, favorite channel, or personal profile as described below. The list of suggested entries resulting from the program abstract search methodology described above could then be further refined and reduced based on the results of accumulating the weighted indicators corresponding to the programs listed. For example, weighted numbers can be assigned to programs based primarily on the category of the program. The weighted numbers are used by the system to refine the search. Those programs suggested from the program abstract search can then be prioritized and either displayed in prioritized order or further refined by deleting programs not satisfying a minimum weight threshold thereby reducing the list of suggested programs displayed to the viewer. The refined list is then displayed to the viewer.

c. Other Program Suggestion Embodiments

Figure 12A:
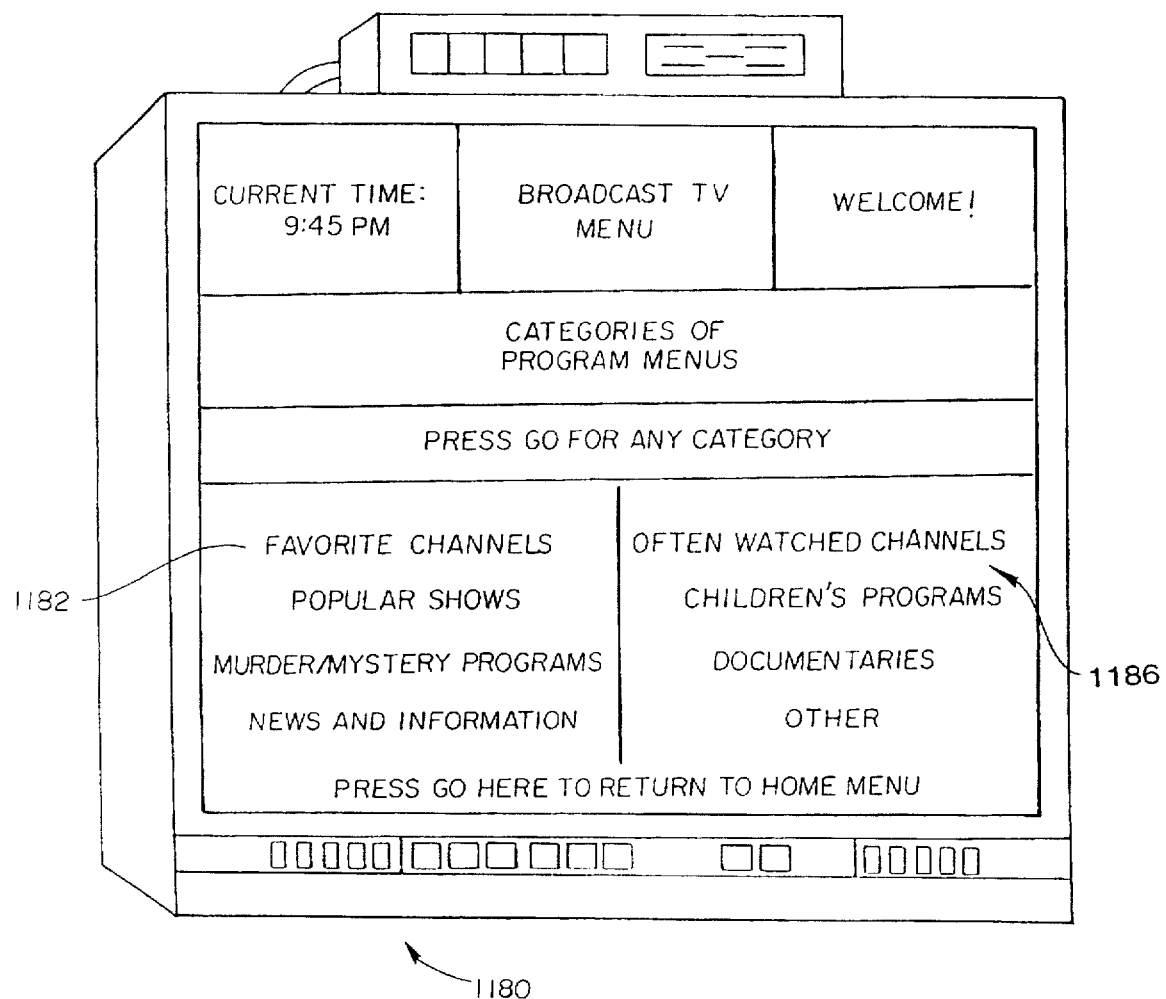
FIGS. 12a and 12b are drawings of a broadcast television menu and submenu.
Figure 12B:
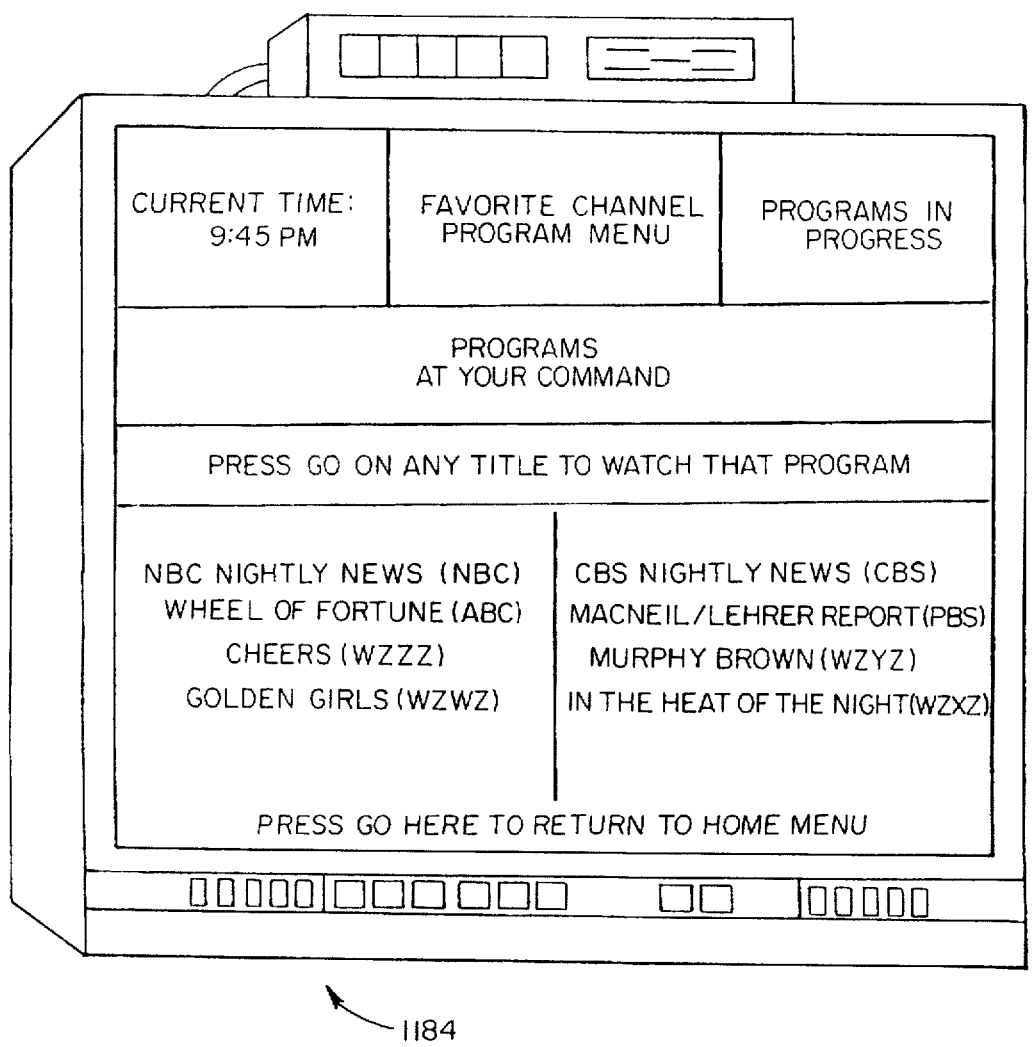

In another "Responsive" embodiment, a favorite channel list can be established based on responses to inquiries. In this embodiment, menus can be used to query a subscriber and allow the subscriber to select eight favorite channels for later display. FIG. 12a depicts a menu 1180, the Broadcast TV Menu, with a favorite channels category of program menus 1182 for selection. FIG. 12b shows an example of a favorite channel program submenu 1184 being displayed. Although a variety of types of information can be requested, mood questions and inquiries on personal information about a subscriber are preferred for this responsive method of selecting programs for viewers.

In another embodiment, both favorite channels and often watched channels features can be utilized during menu selection. As described above, favorite channels can be stored in memory in the set top terminal 220 for later use. In addition to favorite channels, the broadcast TV menu 1180, has a separate often watched channels category 1186 which allows the subscriber or the set top terminal 220 in a learning mode to choose eight additional channels for display.

In another embodiment, in a manner similar to learning the most often watched channels of the subscriber, the terminal can also determine the most often watched programs by the subscriber. After developing (or learning) a list of popular shows or querying the subscriber for a list of popular shows the terminal can display a customized submenu allowing the subscriber to choose one of the suggested popular shows available for viewing. In order to display suggested programs that are available, the set top terminal 220 must cross reference the available programs with the viewers choices. This can be accomplished using the program control information signal. After the cross reference, a popular show submenu similar to the favorite channel submenu shown in FIG. 12b may be displayed on the television or monitor.

In one embodiment, a sophisticated program viewing suggestion feature is available as an optional feature for the subscriber. This feature gives the indecisive viewer or lazy viewer specific suggestions as to which programs the viewer should watch. The set top terminal 220 uses a combination of intelligent and responsive methodologies along with a matching algorithm to accomplish the program viewing suggestion feature.

In order for the set top terminal 220 to make decisions on which programs the subscriber should watch, the terminal creates a personal profile for the particular viewer. Using the data in the particular viewer's personal profile, subscriber mood information and the television program information available in the program control information signal, the set top terminal 220 is able to select a group of programs which the particular viewer is most likely to watch.

Specifically, the set top terminal 220 builds a personal profile for each viewer and stores the information in a memory file by viewer name. To build a personal profile, the viewer answers a series of questions presented on a series of menu screens. These personal profile screens request the viewer to input information such as name, sex, age, place of birth, place of lower school education, employment type, level of education, amount of television program viewing per week, and the number of shows in particular categories that the viewer watches in a given week such as, sports, movies, documentaries, sitcoms, etc. A universal remote control 900 with alpha-numeric buttons may be used to assist in entering the demographic data. Any subscriber demographic information which will assist the set top terminal 220 in suggesting television programs to the viewer may be used. This raw data must be interpreted, formatted, and stored in memory by the set top terminal 220. Preferably the gathered data is processed and stored in a relational database. Once a personal profile has been created (in a particular set top terminal 220), it can be indefinitely stored in nonvolatile memory.

Alternatively, the personal profile information may be electronically transmitted to the set top terminal 220 from a remote location such as the cable headend 208 or billing site. In some cable systems, personal profile information is stored at the billing site. This information can be electronically transmitted via phone or cable to the set top terminal 220. The set top terminal 220 must receive the data, interpret the data, and format the data for storage in a database in memory, as well as for later use.

A selection at the home menu screen 1010 (FIG. 8) activates the program selection feature. Following activation of the program selection feature, as shown in FIGS. 12c–12e, the set top terminal 220 will present the viewer with a series of brief questions to determine the viewer's mood at that particular time. For example, the first mood question screen 1190 may ask the viewer to select whether a short (30 minute), medium (30–60 minute), or long (60 plus minute) program selection is desired, as shown in FIG. 12c. The second mood question screen 1192 requests the viewer to select between a serious program, a thoughtful program, or a light program, as shown in FIG. 12d. And the third mood question screen 1194 requests whether the user desires a passive program or an active program, as shown in FIG. 12e. The viewer makes a selection in each question menu utilizing the cursor movement keys and "go" button on his remote control 900. A variety of other mood questions are possible such as the fatigue level of the viewer, whether the viewer is in the mood for older programming, etc.

After the viewer has responded to the mood question menus which determine the viewer's mood, the set top terminal 220 uses a matching algorithm to find the best programming matches for the viewer and displays an offering of several suggested programs to the viewer (three or more programs are preferred). The matching algorithm compares the viewer profile data, mood data, and most often watched program information (if available, or favorite program information) with information about the program derived from the program control information (or STTCIS) signal, such as show category, description type, length, etc. Using the personal profile information and mood questions suggested above, the following types of outcomes are possible.

If the set top terminal 220 is presented with a young female viewer, educated in Boston who watches sitcoms on a regular basis, and desires a short, light, passive program, a match might be found with the 30-minute sitcom Cheers, the sitcom Designing Women, or Murphy Brown. Taking another example, for a middle-aged male viewer from the Boston area, wishing a longer length, light, passive program, the New England Patriots Football™ game, the Boston Red Sox Baseball™ game or a science fiction movie might be suggested.

With this program selection feature, the set top terminal 220 can intelligently assist the specific viewer in selecting a television program from among hundreds of available choices. The viewer is preferably offered a graphic menu of suggested program choices from which to choose.

Instead of the set top terminal 220 requiring an input of personal profile information, the terminal may also "learn" the personal profile information. A subscriber's viewing habits may be "learned" by maintaining historical data on the subscriber and analyzing this data. The historical data may include the channels (or networks) and types of programs the viewer has most frequently watched, time of viewing, duration of viewing, duration of programs viewed etc. This information must then be analyzed to profile the viewer.

In the preferred "learning" embodiment, the personal profile information is time and date sensitive in that program indicators will be different depending on the date and time of day. For example, a working male with a high school education who has been active in sports or enjoys sporting events might have a heavily weighted sport program indicator during the day on the weekend days but a heavy comedy program indicator in the late evenings on weekdays. His profile might show light programming on working day evenings. After analysis, the indicators can be communicated to the weighing algorithm and the matching algorithm which selects the suggested television programs. The matching algorithm may be implemented through the use of a logic network. The logic network includes a signal detector which could be used for storing and accumulating the weighted indicators. Based on the accumulated weighted indicators, the logic network could provide a selection signal for use in matching to a suggested program.

Figure 13A:
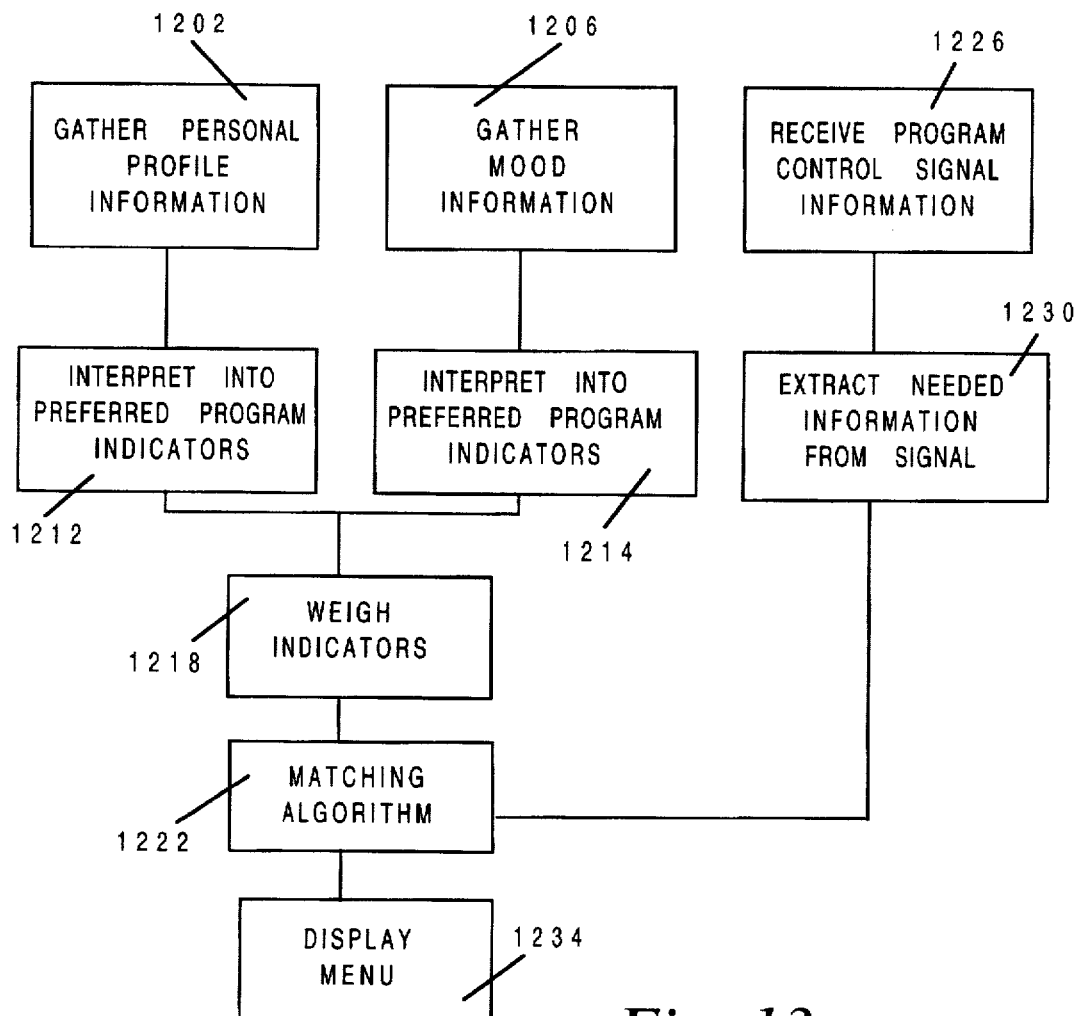
FIG. 13a is a drawing of a method for selecting programs for display.

Examining FIG. 13a, two gathering steps are required, personal information and mood information gathering, denoted at blocks 1202, 1206, respectively. As described above, there are several methods in which this information may be gathered. Once it is gathered, it may be stored (and updated as necessary) for future use. The indicators may be newly calculated for each subscriber entry into the program selection system. Alternatively, at least each time the information gathered is changed or updated, the information must be reinterpreted and converted into preferred program indicators, blocks 1212, 1214.

Program indicators should at a minimum indicate the type of programming to be suggested. To accomplish this, television programs are divided into program categories preferably the same or similar to those categories used for the menu sequence for menu selection of programs (described in the detailed description of the set top terminal 220). For example, sports, comedy, news, documentaries, and hit movies may be program categories. Although a variety of program indicators can be used, the preferred method is to assign a weight to each program category. Thus, a database of information can be analyzed and weights can be assigned to the program categories such as sports (40), comedy (30), news (20), documentaries (5), hit movies (5).

Using the example shown in FIG. 13a, a set of preferred program indicators consisting of categories and weights are assigned based on the personal profile data. A second set of preferred program indicators are assigned based upon the mood data. These two sets of preferred program indicators would then be analyzed and weighted, block 1218, prior to entering the matching algorithm, block 1222.

In a specific example, a subscribers updated personal profile might indicate: sports (40), comedy (30), news (20), documentaries (5), hit movies (5); The subscribers mood might indicate: sports (40), comedy (20), news (5), documentaries (5), hit movies (30). The weight given to mood might be a factor of three while the weight given to personal profile might be a factor of one, since mood information is the more recent and important information. The weighted indicators passed onto the matching algorithm would be three times the mood indicators plus one times the personal profile indicators, namely: sports (160), comedy (90), news (35), documentaries (20), hit movies (95). Therefore, the matching algorithm will focus on sports but also provide selections in hit movies and comedy. The matching algorithm is unlikely to suggest any programs in the news or documentaries categories.

The more areas of information that are gathered and used for indicators, the more weighing factors and calculations that are necessary by the weighing algorithm. Other more sophisticated methods of weighing the importance of the data may be used.

The matching algorithm receives program control signal information, block 1226, and extracts needed information therefrom, block 1230, then matches programs with subscribers. The matching algorithm involves three primary steps: (1) eliminating programs that are out of the subscribers desired time frame, (2) eliminating programs in program categories that the subscriber is not interested in watching, and (3) determining priority of desired programs. Finally, the selected programs are displayed, block 1234.

The first two steps eliminate the programs in which the viewer has shown no interest. The first step eliminates programs out of time sequence (current start time or next half hour) and outside the desired length (e.g. 30–60 minutes). With two or three hundred channels in the program delivery system this would reduce the program choices by approximately two thirds to roughly 100 programs.

The next step eliminates programs in program categories that have received the lower program indicator numbers. For instance, in the example above the news and documentaries program category received low indicator numbers. Programs in these categories are eliminated. This generally reduces the number of programs by at least 40 percent from about 100 to 60 or so programs.

The next step is to assign weight numbers to each program. Weight numbers are assigned to programs based primarily on the category of the program. If programs are in two program categories (e.g. hit movie and comedy) an average is taken of the two assigned weight numbers for each program category. The weighted numbers are used by the system as the subscribers selection criteria.

Having weighted the programs, the number of relevant programs can be reduced by examination of the weighted numbers. It is preferred that ultimately the hundreds of available television programs be reduced to the twenty or so programs most likely to be viewed by the subscriber.

A variety of methods can be used to determine the final priority of the programs. Where using certain selection methodologies, programs in the same category have the same weight, other finer methods of differentiation may be used. For example, programs receiving the same weight can be further distinguished by network. Programs on the major networks may take priority over programs on smaller networks. Programs that are on networks that the viewer watches more frequently can be given priority over networks less frequently watched. Another example of differentiation is that newer programs (more recently filmed programs) are given priority over older programs. Finer methods of gradation may be accomplished by refining the weighted numbers assigned to the programs or through simple reprioritizing of programs on the short list of twenty programs.

Following the matching, the programs may be displayed on a menu screen generated as described earlier. A signal identifying the suggested programs is generated to assist in the menu generation process. It is preferred that 4 to 8 selections are shown on a menu screen. If none of these selections are satisfactory to the viewer, then a second and third menu screen of program choices may be displayed. Upon selection of a program the set top terminal tunes or switches the viewer to the chosen program.

Figure 13B:
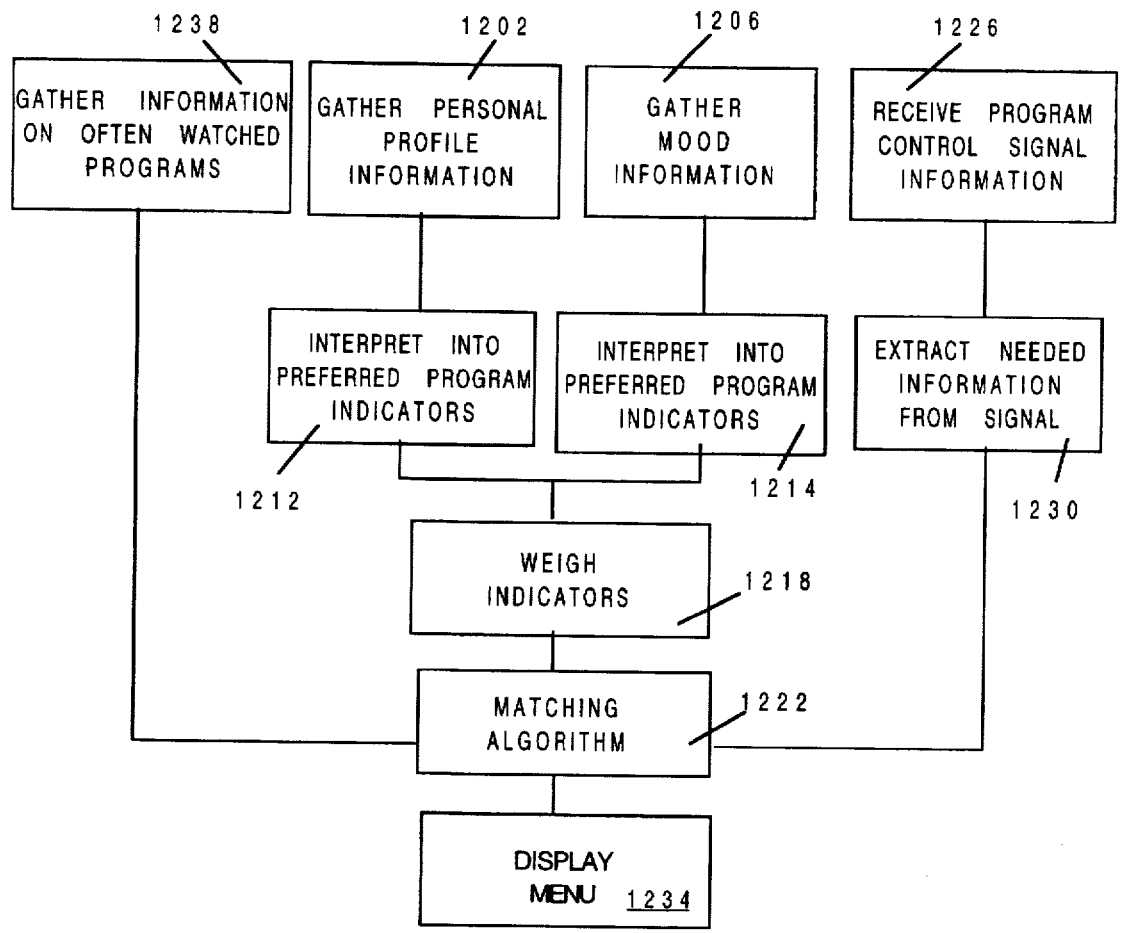
FIG. 13b is a drawing of a more detailed method for selecting programs for display.

In an alternative embodiment, as shown in FIG. 13b (commonly numbered with FIG. 13a except for block 1238), program watched information, block 1238, can be used directly in the matching algorithm. One way in which the program watched information can be used directly by the matching algorithm is by determining and using the often watched information in the final decision step. After the matching algorithm has ordered a selection of programs for the viewer the often watched program list may be used to modify or refine the final program list prior to display. For example, the matching algorithm may choose 20 of 100 programs and order the programs 1 through 20 from the most likely to the least likely viewer choices. This ordered list of 20 is compared with the most often watched program list.

A simple use of the list would be to compare between the ordered list of 20 selected programs and the often watched list, to locate the matches or closely related programs and increase the order number of those programs or "bump up" those programs on the ordered list. A second method would be to increase the located programs weighted number before ordering the 20 programs according to weight. In either case, the effect is that the often watched programs are shifted to a higher priority on the list of twenty programs and ultimately may be placed on the first suggested menu screen of programs. A third method of using the information would be to locate any often watched program existing within the 100 current programs and assign each located program a high weighted value before the matching algorithm calculations described above are performed.

In an alternative embodiment, additional coded information is provided to the set top terminal 220 via the program control information signal to assist with the program selection. For example, demographic codes for each program may be sent via the program control information signal. Additional bits could be added to the frame shown in FIG. 7a to facilitate the communications of the code from the controller to the set top terminal 220. A code table could be stored in memory at the network controller 214. Each code would correspond to an attribute. In this embodiment, a program database would comprise a listing of hundreds of programs along with codes which provide descriptive attributes pertaining to the program. These attributes could be similar to the entries already described above in the menus of FIGS. 11a–11e. The demographic codes describe the subscriber demographics most likely to match with the program. Thus, a comparison of the stored demographics in the personal profile and the demographic codes will render a list of preferred programs for the subscriber. Those skilled in the art will realize that a variety of information may be sent by code via the program control information signal.

Although the embodiments specifically describe the use of several sources of information to suggest programs to the subscriber (i.e. mood and personal profile), those skilled in the art will realize that any one source of information or many more sources may be used. Those skilled in the art will also realize that this program suggestion methodology is not limited to the specifics types of information described but can be used with various types of information that indicate a viewer preference.

Using these methodology, it is even possible for the set top terminal 220 to suggest programs for two viewers. By using two sets of viewer profile information, the matching algorithm can find the best match for joint viewing. For example, the set top terminal 220 can suggest programs for a couple watching television simultaneously. The terminal would use the data stored in memory for each of the two viewers and determine the couples program selections which are similar or overlap. This method of program selection can resolve disputes between viewers.

Figure 14:
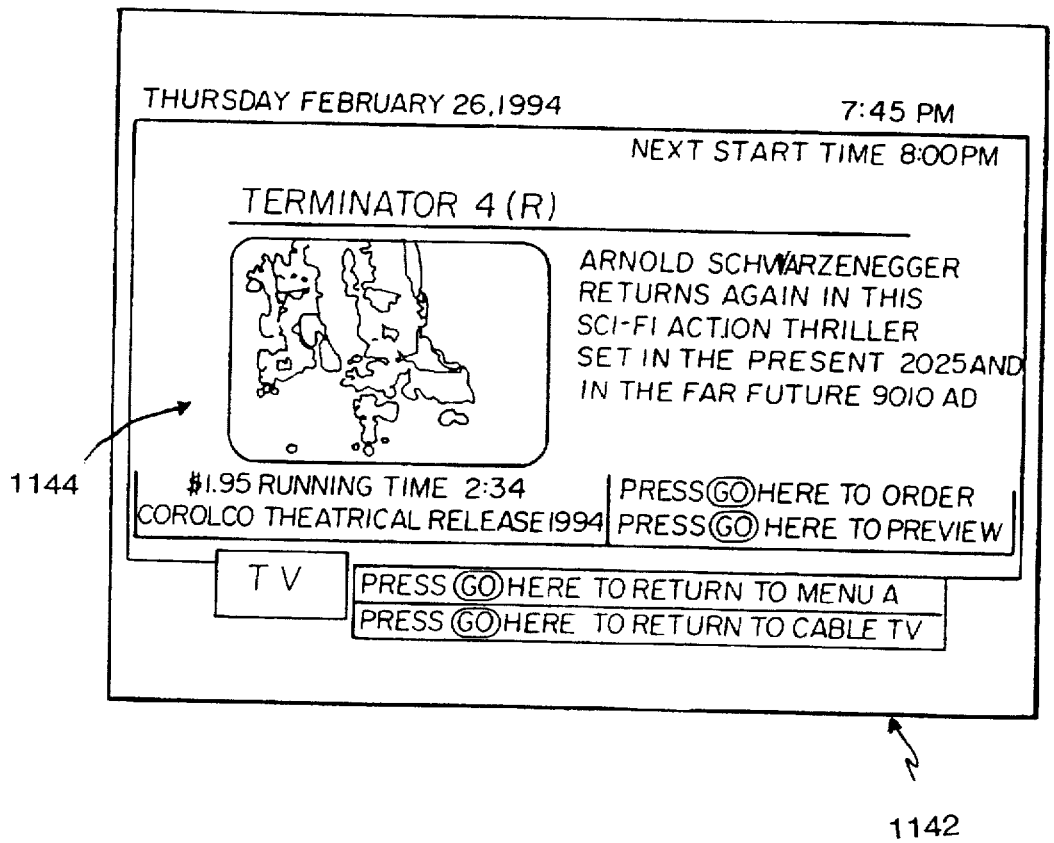
FIG. 14 is a drawing of a movie ordering/preview menu.

After a subscriber selects a suggested program from a menu screen or list of the selection feature, the microprocessor 602 electronically informs the tuning and decompressing hardware of the bandwidth location of the appropriate program (within the television program signal). Armed with this information the set top terminal 220 is able to display the program for the viewer on a television, monitor or similar device. Alternatively, a preview menu screen 1142 as shown in FIG. 14 may be shown to the subscriber which describes and previews the program selection. The preview menu screens may include live video or stills 1144 depicting the program selected.

The terms and descriptions used herein are set forth by way of illustration only and are not meant as limitations. Those skilled in the art will recognize that numerous variations are possible within the spirit and scope of the invention as defined in the following claims.

What is claimed is:

1. A set top terminal used by subscribers of a television program delivery system for suggesting programs to subscribers using program control information containing program description data, and subscriber specific data, the set top terminal comprising:

a means for gathering the subscriber specific data to be used in selecting programs;

a means, connected to the gathering means, for storing the subscriber specific data;

means for receiving the program control information containing the program description data;

program selection means, operably connected to the storing means and the receiving means, for selecting one or more programs using a subscriber's programming preferences and the program control information, comprising:

a processor, wherein the subscriber programming preferences are generated from the subscriber specific data; and means, operably connected to the program selection means, for suggesting the selected programs to the subscriber.

2. The set top terminal of claim 1 wherein the means for gathering the subscriber specific data comprises a means for obtaining the subscriber specific data from a remote location.

3. The apparatus of claim 1 wherein the program selection means resides within a set top terminal.

4. The set top terminal of claim 1 wherein the set top terminal receives menu details from the television program delivery system, a display is used, and wherein the means for gathering subscriber specific data comprises:

a memory device for storing received menu details;

a means, connected to the memory device, for generating menu screens by integrating the program control information with the stored menu details;

a means, connected to the generating means, for eliciting subscriber responses using the generated menu screens; and a subscriber interface means for entering subscriber responses.

5. The set top terminal of claim 4 wherein the stored menu details include a cursor overlay, the means for generating menu screens comprises a means for generating the cursor overlay, the generated menu screens are displayed on the display, and wherein the subscriber interface means comprises a means for moving the generated cursor overlay on the displayed menu screens.

6. The set top terminal of claim 1 wherein a display is used and wherein the set top terminal receives program signals, the set top terminal further comprising a means for generating a signal identifying a selected program's location on the received program signal.

7. A set top terminal used by subscribers of a television program delivery system for suggesting programs to subscribers using program control information containing program description data, and subscriber specific data indicative of a subscriber's programming preferences, wherein the set top terminal receives menu details from the television program delivery system, the set top terminal comprising:

a means for gathering the subscriber specific data indicative of subscriber preferences to be used in selecting programs, wherein the means for gathering subscriber specific data comprises:

a first means for storing received menu details;

a means for generating menu screens by integrating the program control information with the stored menu details;

a display, connected to the generating means, wherein menu screens to elicit subscriber responses are displayed; and a subscriber interface means for entering subscriber responses to displayed menu screens;

a second means, connected to the gathering means, for storing the subscriber specific data;

a means for receiving the program control information comprising program description data;

a program selection means, operably connected to the second storing means and the receiving means, for selecting one or more programs using the subscriber specific data and program control information whereby the selected programs correspond to the subscriber's programming preferences; and wherein the display is used to suggest the selected programs to the subscriber.

8. The set top terminal of claim 7 wherein the stored menu details include a cursor overlay and the means for generating menu screens comprises a means for generating the cursor overlay, and wherein the subscriber interface means comprises a means for moving the generated cursor overlay on the displayed menu screens.

9. A set top terminal used by subscribers of a television program delivery system for suggesting programs to subscribers using program control information containing program description data, and subscriber specific data indicative of a subscriber's programming preferences, the set top terminal comprising:

a means for gathering the subscriber specific data indicative of subscriber preferences to be used in selecting programs;

a means, connected to the gathering means, for storing the subscriber specific data;

a means for receiving the program control information comprising program description data;

a program selection means, operably connected to the storing means and the receiving means, for selecting one or more programs using the subscriber specific data and program control information whereby the selected programs correspond to the subscriber's programming preferences, wherein the program selection means comprises:

a means for matching the subscriber specific data to a program described by the program control information; and wherein the set top terminal further comprises a means for tuning to the matched program; and a means, operably connected to the program selection means, for displaying for suggestion the selected programs to the subscriber.

10. A set top terminal used by subscribers of a television program delivery system for suggesting programs to subscribers using program control information containing program description data, and subscriber specific data indicative of a subscriber's programming preferences, wherein the set top terminal receives program signals, the set top terminal comprising:

a means for gathering the subscriber specific data indicative of subscriber preferences to be used in selecting programs;

a means, connected to the gathering means, for storing the subscriber specific data;

a means for receiving the program control information comprising program description data;

a program selection means, operably connected to the storing means and the receiving means, for selecting one or more programs using the subscriber specific data and program control information whereby the selected programs correspond to the subscriber's programming preferences;

a means, operably connected to the program selection means, for displaying for suggestion the selected programs to the subscriber; and a means for generating a signal identifying a selected program's location on the received program signal.

11. A method used by a set top terminal for a television program delivery system for suggesting programs to subscribers for display on a television using program control information and subscriber specific data, the method comprising:

gathering subscriber specific data to be used in selecting programs;

storing the gathered subscriber specific data;

receiving program control information to be used in selecting programs;

selecting one or more programs using a subscriber's programming preferences and the received program control information, wherein the subscriber programming preferences are generated from the subscriber specific data; and suggesting the selected programs to the subscriber.

12. The method of claim 11 wherein a display is used and wherein the set top terminal generates menus based on menu details received over the program television delivery system further comprising the following steps:

storing the received menu details;

generating menu screens using the stored menu details by integrating the received program control information with the stored menu details;

displaying menu screens whereby the menu screens identify the selected programs; and receiving subscriber responses to the displayed menu screens.

13. A method used by a set top terminal for a television program delivery system for suggesting programs to subscribers for display on a television using program control information and subscriber specific data indicative of a subscriber's programming preferences, wherein the set top terminal generates menus based on menu details received over the program television delivery system, the method comprising the following steps:

storing the received menu details;

gathering subscriber specific data indicative of subscriber preferences to be used in selecting programs;

storing the gathered subscriber specific data;

receiving program control information to be used in selecting programs;

selecting one or more programs using the stored subscriber specific data and received program control information wherein the selected programs correspond to the subscriber's programming preferences;

generating menu screens using the stored menu details by integrating the received program control information and the stored menu details;

displaying menu screens whereby the menu screens identify the selected programs and suggest the selected programs to the subscriber; and receiving subscriber responses to the menu screens.

14. A set top terminal used by subscribers of a television program delivery system for suggesting programs to subscribers using program control information containing menu screen details and program description data, and a subscriber's programming preferences, by searching program abstracts stored in a database for programs which correlate to key words mapped from one or more subscriber responses to search criteria containing a plurality of selectable entries on one or more menu screens, comprising:

a means for receiving the program control information;

a means for storing the program abstracts in a database;

a memory means, connected to the receiving means, for storing the menu screen details;

means, connected to the memory means for storing menu screen details, for generating menu screens using the stored menu screen details, wherein the menu screens are generated by integrating the program control information with the stored menu screen details, and wherein the menu screens list search criteria comprising the plurality of selectable entries;

a display wherein the generated menu screens are displayed;

a subscriber interface means for entering subscriber responses to the plurality of selectable entries on the menu screens;

a means, connected to the subscriber interface means, for mapping the subscriber responses into the key words;

a means, connected to the mapping means, for searching the program abstract database for programs consisting of one or more of the key words;

a program selection means, operably connected to the receiving means and searching means, for selecting one or more programs, wherein programs are selected using the search of the searching means; and wherein the display is used to suggest the selected programs to the subscriber.

15. The set top terminal of claim 14 wherein program abstracts are included in the received program control information, and wherein the set top terminal further comprises a means connected to the receiving means, for reprogramming the means for storing the program abstracts to include the received program abstracts.

16. The set top terminal of claim 14 wherein the subscriber interface means comprises a means for interpreting the subscriber responses and a means for storing the subscriber responses.

17. The set top terminal of claim 14 wherein the generated menu screens comprise main menus and submenus and the means for generating menu screens comprises a means for generating submenus whereby selectable entries are listed in the submenus and each submenu corresponds to a search criterion in a main menu.

18. The set top terminal of claim 14 wherein the program selection means comprises:

means for obtaining preferred program indicators from a remote location;

means for assigning a weight number to programs using the preferred program indicators; and means for analyzing the assigned weight numbers.

19. The set top terminal of claim 18 wherein the means for analyzing the assigned weight numbers further comprises a means for prioritizing programs.

20. The set top terminal of claim 14 wherein the stored menu screen details include a cursor overlay and the means for generating menu screens comprises a means for generating the cursor overlay and wherein the subscriber interface means comprises a means for moving the generated cursor overlay on the displayed menu screens.

21. A method used by a set top terminal for a television program delivery system for suggesting programming to subscribers using program control information containing menu screen details by searching program abstracts for programs which correlate to key words mapped from one or more subscriber responses to search criteria containing a plurality of selectable entries on one or more menu screens displayed on a television, comprising the steps of:

receiving the program control information;

storing the program abstracts in a database;

storing menu screen details;

generating the menu screens wherein the menu screens are generated by integrating the program control information with the stored menu screen details, and wherein the generated menu screens list the search criteria containing the plurality of selectable entries;

displaying the menu screens;

gathering subscriber responses to the plurality of selectable entries on the menu screens;

mapping the subscriber responses into the key words;

searching the stored program abstracts for abstracts comprising one or more of the key words;

selecting one or more of the programs, whereby the programs are selected using the search of the stored program abstracts; and suggesting the selected programs.

22. A set top terminal used by subscribers of a television program delivery system for suggesting programs to subscribers using program control information containing mood menu details, and subscriber specific data indicative of a subscriber's programming preferences determined from subscriber responses to a set of mood questions presented on mood menu screens, the set top terminal comprising:

- a means for receiving the program control information containing mood menu details;
- a memory means, connected to the receiving means, for storing the received mood menu details;
- a means, connected to the receiving means and memory means, for generating the mood menu screens by integrating the received program control information with the stored mood menu details;
- a means for displaying one or more of the generated mood menu screens;
- a subscriber interface means for entering subscriber specific data in response to the displayed mood menu screens;
- a program selection means, operably connected to the subscriber interface means and the receiving means, for selecting one or more programs using the subscriber specific data and the program control information whereby the selected programs correspond to the subscriber's programming preferences; and
- a means, operably connected to the program selection means, for suggesting the selected programs to the subscriber.

23. The set top terminal of claim 22 wherein the program selection means comprises:
- means for obtaining preferred program indicators from a remote location; and
- means for assigning a weight number to programs using the preferred program indicators.

24. A set top terminal used by subscribers of a television program delivery system for suggesting programs to subscribers using program control information containing demographic codes created at a remote location and assigned to each television program and demographic data created at a remote location describing subscribers using the set top terminal, comprising:
- a means for receiving the program control information comprising the demographic codes and demographic data;
- a memory means, operably connected to the receiving means, for storing the received demographic data;
- a program selection means, operably connected to the memory means and the receiving means, for selecting one or more programs using the received program control information containing the demographic data and demographic codes; and
- a means, operably connected to the program selection means, for displaying for suggestion the selected program.

25. A set top terminal used by subscribers of a television program delivery system for suggesting programs through the use of program control information and program watched data indicative of a subscriber's most watched programs, the set top terminal comprising:
- a means for receiving program control information;
- a means for gathering the program watched data;
- a memory means for storing the gathered program watched data;
- a program selection means, operably connected to the memory means and the receiving means, for selecting a program using the stored program watched data and the received program control information;
- a means, operably connected to the program selection means, for displaying the selected program.

26. A set top terminal used by subscribers of a television program delivery system for suggesting programs to subscribers using program control information and channel watched data indicative of a subscriber's favorite channels, the set top terminal comprising:
- a means for gathering the channel watched data;
- a means for receiving the program control information;
- a memory means for storing the gathered channel watched data;
- a processing means, operably connected to the memory means and the receiving means, for determining suggested favorite channels, comprising:
  - a channel selection means for selecting a plurality of channels using the stored channel watched data; and
  - means to generate a signal identifying the selected channels; and
- a means, operably connected to the processing means, for displaying a representation of the selected channels.

27. A television program delivery and presentation system for delivering menu selectable programs to a subscriber in a digital format and for suggesting certain of those delivered programs for viewing by the subscriber on a television, using program control information wherein the programs are combined and compressed with the program control information, comprising:
- a means for converting programs to a digital format;
- a means for generating program control information;
- means, connected to the converting means and the generating means, for packaging the digital format programs using the program control information;
- means for combining and compressing the packaged programs and program control information into a composite signal;
- means for transmitting the composite signal;
- a set top terminal connected to the television comprising:
  - a means for receiving the composite signal;
  - a means for creating personal profile information;
  - a means, connected to the creating means, for storing the personal profile information;
  - a means, connected to the receiving means, for generating menus using the program control information;
  - a means for gathering viewer mood information using the generated menus;
  - a means, connected to the gathering means and storing means, for selecting at least one program for suggestion to the viewer, comprising:
    - a means for integrating the stored personal profile information and gathered viewer mood information into selection criteria;
    - a means for comparing the selection criteria and the received program control information; and
    - a means for matching the selection criteria with one or more received programs; and
  - a means for displaying the suggested program for suggestion to the viewer.

28. A terminal for program suggestion using user preference data concerning user preferences and program control information concerning available programs, comprising:
- a means for gathering the user preference data;
- a means, connected to the gathering means, for storing the gathered user preference data;
- a means for accessing the program control information;
- a means, connected to the storing means and accessing means, for selecting one or more programs using a subscriber's programming preferences and the program control information, comprising:
- a processor, wherein the subscriber programming preferences are generated from the user preference data; and
- a means, connected to the selecting means, for suggesting the selected programs to the user.

29. The terminal of claim 28, wherein the terminal further comprises a kiosk, whereby the kiosk comprises means for displaying the selected programs for suggestion to the user.

30. The terminal of claim 28, wherein the terminal is used for video rental and to suggest programs stored on video tape, and wherein the program control information comprises information concerning programs stored on video tape and wherein the means for suggesting comprises a means for indicating a video tape.

31. A terminal for program suggestion using user preference data concerning user preferences and program control information concerning available programs, comprising:
- a means for gathering the user preference data;
- a means, connected to the gathering means, for storing the gathered user preference data;
- a means for accessing the program control information;
- a means, connected to the storing means and accessing means, for selecting one or more programs using the user preference data and the program control information, whereby the selected programs correspond to the gathered user preference data; and
- a kiosk, wherein the kiosk comprises means, connected to the selecting means, for displaying the selected programs for suggestion to the user.

32. A terminal for program suggestion using user preference data concerning user preferences and program control information concerning available programs, wherein the terminal is used for video rental and to suggest programs stored on video tape, and wherein the program control information comprises information concerning programs stored on video tape, comprising:
- a means for gathering the user preference data;
- a means, connected to the gathering means, for storing the gathered user preference data;
- a means for accessing the program control information;
- a means, connected to the storing means and accessing means, for selecting one or more programs using the user preference data and the program control information, whereby the selected programs correspond to the gathered user preference data; and
- a means, connected to the selecting means, for suggesting the selected programs to the user, wherein the means for suggesting comprises a means for indicating a video tape.

33. A network controller, adapted for remotely controlling a plurality of set top terminals in a television program delivery system, for suggesting programs to subscribers by making program suggestions using subscriber specific data and program control information received from a remotely located source containing program description data, wherein the suggested programs are transmitted to the set top terminal, the network controller comprising:
- a means for receiving the program control information containing program description data;
- a means for gathering the subscriber specific data from a set top terminal;
- a means, connected to the gathering means, for storing the subscriber specific data;
- a means, operably connected to the receiving means and the storing means, for suggesting one or more programs using a subscriber's programming preferences and the received program control information, comprising:
  - a processor, wherein the subscriber programming preferences are generated from the subscriber specific data; and
- a means, connected to the suggesting means, for transmitting the suggested programs to the set top terminal for presentation to the subscriber.

34. The network controller of claim 33 wherein key words are used in searching program abstracts to assist in suggesting programs, and wherein the network controller further comprises:
- a means for storing program abstracts; and
- wherein the means for suggesting comprises a means for searching the stored program abstracts for one or more programs consisting of one or more of the key words.

35. A network controller, adapted for remotely controlling a plurality of set top terminals in a television program delivery system, for suggesting programs to subscribers by making program suggestions using subscriber specific data indicative of a subscriber's programming preferences received from a set top terminal, program control information received from a remotely located source containing program description data, and program abstracts with key words, wherein the suggested programs are transmitted to the set top terminal, the network controller comprising:
- a means for receiving the program control information containing program description data;
- a means for gathering the subscriber specific data indicative of subscriber preferences from a set top terminal;
- a means, connected to the gathering means, for storing the subscriber specific data;
- a memory means for storing program abstracts;
- a means, operably connected to the receiving means and the storing means, for suggesting one or more programs using the stored subscriber specific data and the received program control information, whereby the suggested programs correspond to the subscriber's programming preferences, wherein key words are used in searching the stored program abstracts to assist in suggesting programs, and wherein the means for suggesting comprises:
  - a means for searching the stored program abstracts for one or more programs consisting of one or more of the key words; and
- a means, connected to the suggesting means, for transmitting the suggested programs to the set top terminal for presentation to the subscriber.

36. A program suggestion system for suggesting programs to subscribers of a television program delivery system by using program control information containing program description data and by searching program abstracts stored in a database at a network controller, the suggested programs resulting from a search of the program abstracts for key words sent to the network controller from a set top terminal, wherein the key words are mapped from one or more subscriber responses to a plurality of selectable entries at the set top terminal, the system comprising:
- a set top terminal comprising:
  - a means for receiving programs;
  - a means for presenting the plurality of selectable entries to the subscriber;
  - a subscriber interface means for entering subscriber responses to the plurality of selectable entries; and a means, connected to the subscriber interface means, for mapping the subscriber responses into the key words; and a network controller, networked to the set top terminal, comprising:

a means for receiving the program control information;

a means for storing the program abstracts in a data base;

a means for gathering the key words;

a program selection means, operably connected to the receiving means, gathering means and storing means, for selecting one or more programs for suggestion to the subscriber, comprising:

a means for searching the program abstract data base for program abstracts consisting of one or more key words; and a means for distributing the selected programs to the set top terminal.

37. A network controller for suggesting programs to subscribers of a television program delivery system by using program control information containing program description data and by searching program abstracts for key words that are mapped from one or more subscriber responses received from a set top terminal, comprising:

a means for receiving the program control information;

a means for storing the program abstracts in a data base;

a means for gathering subscriber responses to a plurality of selectable entries from the set top terminal;

a means, connected to the gathering means, for mapping the subscriber responses into the key words;

a means, operably connected to the receiving means, storing means, gathering means and mapping means, for suggesting one or more programs, comprising:

a means, connected to the storing and mapping means, for searching the program abstract data base for one or more key words; and a means for distributing the suggested programs to the set top terminal.

38. A set top terminal used by subscribers of a television program delivery system for suggesting programs to subscribers using program control information containing program description data, by searching program abstracts for programs which correlate to key words mapped from one or more subscriber responses to a plurality of selectable entries presented on a display, comprising:

a means for receiving the program control information;

a means for storing the program abstracts in a database;

a means for presenting the plurality of selectable entries to the subscriber using the display;

a subscriber interface means for entering subscriber responses to the plurality of selectable entries;

a means, connected to the subscriber interface means, for mapping the subscriber responses into the key words;

a means, connected to the mapping means and storing means, for searching the program abstract database for programs consisting of one or more of the key words;

a program selection means, operably connected to the receiving means and searching means, for selecting one or more programs, wherein programs are selected using the search of the searching means; and means, connected to the program selection means, for suggesting the selected programs to the subscriber using the display.

39. The set top terminal of claim 38 wherein program abstracts are included in the received program control information, and wherein the set top terminal further comprises a means, connected to the receiving means, for reprogramming the means for storing the program abstracts to include the received program abstracts.

40. The set top terminal of claim 38 wherein the program control information further contains menu screen details and the selectable entries are displayed on one or more menu screens by the presenting means, the set top terminal further comprising:

a memory means, connected to the receiving means, for storing the menu screen details; and a means, connected to the memory means and the presenting means, for generating menu screens using the stored menu screen details, wherein the menu screens are generated by integrating the program control information with the stored menu screen details, and wherein the generated menu screens list search criteria comprising the plurality of selectable entries.

41. The set top terminal of claim 40 wherein the generated menu screens comprise main menus and submenus and the means for generating menu screens comprises a means for generating submenus whereby selectable entries are listed in the submenus and each submenu corresponds to a search criterion in a main menu.

42. The set top terminal of claim 40 wherein the stored menu screen details include a cursor overlay and the means for generating menu screens comprises a means for generating the cursor overlay, and wherein the subscriber interface means comprises a means for moving the generated cursor overlay on the displayed menu screens.

43. A method used in a television program delivery system for suggesting programs to subscribers for display on a television using program control information and subscriber specific data, the method comprising:

gathering subscriber specific data to be used in selecting programs;

storing the gathered subscriber specific data;

receiving program control information to be used in selecting programs;

selecting one or more programs using a subscriber's programming preferences and the received program control information, wherein the subscriber programming preferences are generated from the subscriber specific data; and suggesting the selected programs to the subscriber.

44. A method used in a television program delivery system for suggesting programming to subscribers using program control information containing menu screen details by searching program abstracts for programs which correlate to key words mapped from one or more subscriber responses to search criteria containing a plurality of selectable entries on one or more menu screens displayed on a television, comprising the steps of:

receiving the program control information;

storing the program abstracts in a database;

storing the menu screen details;

generating the menu screens wherein the menu screens are generated by integrating the received program control information with the stored menu screen details, and wherein the generated menu screens list the search criteria containing the plurality of selectable entries;

displaying the menu screens;

gathering subscriber responses to the plurality of selectable entries on the menu screens;

mapping the gathered subscriber responses into the key words;

searching the stored program abstracts for abstracts comprising one or more of the key words;

selecting one or more of the programs, whereby the programs are selected using the search of the stored program abstracts; and suggesting the selected programs.

45. A method used in a television program delivery system for suggesting programming to subscribers using program control information and by searching program abstracts for programs which correlate to key words mapped from one or more subscriber responses to a plurality of presented selectable entries, comprising the steps of:

receiving the program control information;

storing the program abstracts in a database;

presenting the plurality of selectable entries;

gathering subscriber responses to the plurality of selectable entries;

mapping the gathered subscriber responses into the key words;

searching the stored program abstracts for abstracts comprising one or more of the key words;

selecting one or more of the programs, whereby the programs are selected using the search of the stored program abstracts; and suggesting the selected programs.

46. A set top terminal used by subscribers of a television program delivery system for suggesting programs to subscribers using program control information containing scheduled program description data, the set top terminal comprising:

a means for creating personal profile information;

a means, connected to the creating means, for storing the personal profile information;

means for receiving the program control information comprising the scheduled program description data;

a means, connected to the storing means and receiving means, for selecting at least one program for suggestion to the viewer, comprising:

a means for transforming the personal profile information into preferred program indicators, wherein a preferred program indicator comprises a program category with each program category having a weighted value;

a means for matching the preferred program indicators with the scheduled program description data, wherein each scheduled program is assigned a weighted value based on at least one associated program category;

a means for prioritizing the scheduled programs from highest weighted value programs to lowest weighted value programs;

a means for indicating one or more programs meeting a predetermined weight related threshold, wherein all other programs are excluded from program suggestion; and means, operably connected to the program selection means, for displaying for suggestion the selected programs to the subscriber.

47. The set top terminal of claim 46 further comprising a means for gathering subscriber specific data, wherein the means for creating personal profile information utilizes the gathered subscriber specific data.

48. A set top terminal used by subscribers of a television program delivery system for suggesting programs to subscribers using program control information containing scheduled program description data, and subscriber specific data, the set top terminal comprising:

a means for gathering the subscriber specific data, wherein the subscriber specific data comprises subscriber mood data;

a means for creating personal profile information;

a means, connected to the gathering means and the creating means, for storing the subscriber mood data and the personal profile information;

means for receiving the program control information comprising scheduled program description data;

a means, connected to the storing means and receiving means, for selecting at least one program for suggestion to the viewer, comprising:

a means for integrating the personal profile information and subscriber mood data into preferred program indicators, wherein a preferred program indicator comprises a program category with each program category having a weighted value;

a means for comparing the preferred program indicators with the scheduled program description data in the received program control information, wherein each scheduled program is assigned a weighted value according to at least one associated program category;

a means for prioritizing the scheduled programs from highest weighted program values to lowest weighted program values;

a means for indicating one or more programs meeting a predetermined weight threshold, wherein all other programs are excluded from program suggestion; and means, operably connected to the program selection means, for displaying for suggestion the selected programs to the subscriber.

49. The set top terminal of claim 48 wherein the subscriber specific data further comprises the subscriber's desired program viewing time frame and desired program length and wherein the means for comparing comprises means for excluding programs for suggestion that are not in the subscriber's desired viewing time frame and desired length.

50. A set top terminal used by subscribers of a television program delivery system for suggesting programs to subscribers using program control information containing scheduled program description data, the set top terminal comprising:

a means for gathering program watched data;

a means, connected to the gathering means, for storing the program watched data;

means for receiving the program control information comprising the scheduled program description data;

a means, connected to the storing means and receiving means, for selecting at least one program for suggestion to the viewer, comprising:

a means for transforming the program watched data into preferred program indicators, wherein a program indicator comprises a program category with each program category having a weighted value;

a means for comparing the preferred program indicators with the scheduled program description data, wherein each scheduled program is assigned a weighted value based on at least one associated program category;

a means for prioritizing the scheduled programs from highest weighted value programs to lowest weighted value programs;

a means for indicating one or more programs meeting a predetermined weight threshold, wherein all other programs are excluded from program suggestion; and means, operably connected to the program selection means, for displaying for suggestion the selected programs to the subscriber.

51. An apparatus for suggesting programs to subscribers using program control information containing program description data, and subscriber specific data, the apparatus comprising:

a means for gathering the subscriber specific data to be used in selecting programs;

a means, connected to the gathering means, for storing the subscriber specific data;

a means for receiving the program control information; and a program selection means, operably connected to the storing means and the receiving means, for selecting one or more programs using a subscriber's programming preferences and the program control information, comprising:

a processor, wherein the subscriber programming preferences are generated from the subscriber specific data.

52. A set top terminal used by subscribers of a television program delivery system for suggesting programs to subscribers using program control information containing program description data, and subscriber specific data, the set top terminal comprising:

a means for gathering the subscriber specific data to be used in selecting programs;

a means, connected to the gathering means, for storing the subscriber specific data;

means for receiving the program control information containing the program description data;

program selection means, operably connected to the storing means and the receiving means, for selecting one or more programs using a subscriber's programming preferences and the program control information, comprising:

a processor, wherein the subscriber programming preferences are generated from the subscriber specific data;

wherein the program selection means resides within a network controller; and means, operably connected to the program selection means, for suggesting the selected programs to the subscriber.

53. A method for suggesting programs to subscribers using program control information containing program description data, and subscriber specific data, the method comprising:

gathering the subscriber specific data to be used in selecting programs;

storing the subscriber specific data;

receiving the program control information; and selecting one or more programs using a subscriber's programming preferences and the program control information, wherein the subscriber's programming preferences are generated from the subscriber specific data.

54. An apparatus used by subscribers of a television program delivery system for suggesting programs to subscribers using program control information containing program description data, and subscriber specific data, the apparatus comprising:

a remote control, wherein the subscriber specific data is obtained to be used in selecting programs;

a memory, operably connected to the remote control, wherein the subscriber specific data is stored;

a demodulator, wherein the program control information containing the program description data is received;

a central processing unit, operably connected to the memory and the demodulator, wherein programs are selected using a subscriber's programming preferences and the program control information, and wherein the subscriber programming preferences are generated from the subscriber specific data; and a display, operably connected to the processor, wherein the selected programs are suggested to the subscriber on the display.

55. An apparatus used by subscribers of a television program delivery system for suggesting programs through the use of program control information and program watched data indicative of a subscriber's most watched programs, the apparatus comprising:

a demodulator, wherein the program control information is received;

a remote control interface, wherein the program watched data is gathered;

a memory, wherein the gathered program watched data is stored;

a processor, operably connected to the memory and the demodulator, wherein a program is selected using the stored program watched data and the received program control information;

a display, operably connected to the processor, for displaying the selected program.

56. An apparatus used by subscribers of a television program delivery system for suggesting programs to subscribers using program control information containing program description data, by searching program abstracts for programs which correlate to key words mapped from one or more subscriber responses to a plurality of selectable entries presented on a display, the apparatus comprising:

a demodulator, wherein the program control information is demodulated;

a memory, connected to the demodulator, wherein the program abstracts are stored;

a combiner, wherein the plurality of selectable entries are presented to the subscriber using the display;

a subscriber interface, wherein subscriber responses to the plurality of selectable entries are entered;

logic circuitry, connected to the subscriber interface, wherein the subscriber responses are mapped into the key words;

a processor, operably connected to the logic circuitry and the memory, wherein the stored program abstracts are searched for programs consisting of one or more of the key words, and wherein one or more programs are selected using the search; and wherein the selected programs are suggested to the subscriber using the display.

* * * * *